(12) United States Patent
Rezac et al.

(10) Patent No.: US 12,539,948 B2
(45) Date of Patent: Feb. 3, 2026

(54) DEVICES, SYSTEMS, AND METHODS FOR ALERTING USERS ON A WATERCRAFT

(71) Applicant: Navico, Inc., Tulsa, OK (US)

(72) Inventors: Ryan R. Rezac, Catoosa, OK (US); Gustav Sohtell, Gothenburg (SE)

(73) Assignee: NAVICO, INC., Tulsa, OK (US)

( * ) Notice: Subject to any disclaimer, the term of this patent is extended or adjusted under 35 U.S.C. 154(b) by 236 days.

(21) Appl. No.: 18/345,276

(22) Filed: Jun. 30, 2023

(65) Prior Publication Data

US 2025/0002126 A1    Jan. 2, 2025

(51) Int. Cl.
*B63B 79/30*    (2020.01)
*G06V 20/50*    (2022.01)

(52) U.S. Cl.
CPC .............. *B63B 79/30* (2020.01); *G06V 20/50* (2022.01)

(58) Field of Classification Search
CPC .......... B63B 79/30; B63B 79/10; G06V 20/50
See application file for complete search history.

(56) References Cited

U.S. PATENT DOCUMENTS

| | | | |
|---|---|---|---|
| 7,681,949 B2 | 3/2010 | Nathan et al. | |
| 9,792,801 B2 | 10/2017 | Savolainen et al. | |
| 10,604,222 B1 | 3/2020 | Salisbury et al. | |
| 11,155,327 B1 | 10/2021 | Tate et al. | |
| 11,738,684 B2 * | 8/2023 | Hagelis | G06V 20/58 |
| | | | 340/905 |
| 2007/0075574 A1 | 4/2007 | James | |
| 2016/0077199 A1 * | 3/2016 | Nickel | G01S 15/93 |
| | | | 367/107 |
| 2019/0355230 A1 | 11/2019 | Miller | |
| 2020/0283013 A1 * | 9/2020 | Saito | B60W 60/00133 |
| 2020/0334923 A1 * | 10/2020 | Yamamoto | B60Q 9/00 |
| 2021/0006926 A1 * | 1/2021 | Giron | H04R 1/403 |
| 2021/0078588 A1 * | 3/2021 | Zhu | B60W 50/045 |
| 2022/0242533 A1 * | 8/2022 | Tolley | B63B 21/00 |

FOREIGN PATENT DOCUMENTS

| | | |
|---|---|---|
| JP | 2018-184138 A | 11/2018 |
| JP | 2019-209932 A | 12/2019 |
| WO | WO 2018/161668 A1 | 9/2018 |

* cited by examiner

*Primary Examiner* — Aniss Chad
*Assistant Examiner* — Nikki Marie M Molina
(74) *Attorney, Agent, or Firm* — Nelson Mullins Riley & Scarborough LLP

(57) ABSTRACT

Example systems and methods are provided herein for alerting a user on a watercraft by determining where on the watercraft the user is and providing a physical alert to efficiently and effectively notify the user. A processor is configured to determine an occurrence of one or more triggers, where each of the one or more triggers corresponds to at least one of identifying an object within an image, recognizing a system fault, detecting a triggering event, or detecting an object in a body of water. In response to the one or more triggers, the processor is configured to determine one or more locations on the watercraft in which to report the one or more triggers and then cause one or more devices at the determined one or more locations on the watercraft to perform a physical alert to notify the user.

20 Claims, 10 Drawing Sheets

DEVICES, SYSTEMS, AND METHODS FOR ALERTING USERS ON A WATERCRAFT

FIELD OF THE INVENTION

Example embodiments of the present invention generally relate to alerting a user on a watercraft and, more particularly to, alerting a user on a watercraft in response to an occurrence of one or more triggers.

BACKGROUND

Users on a watercraft frequently move around the watercraft, and watercrafts are often subject to unexpected internal and/or external disturbances. Because a user on the watercraft is not limited to a seat or even to an area within the watercraft, it can be difficult to effectively and efficiently alert the user on the watercraft in the event of an internal or external disturbance or event. For example, if the user passes into the cabin of the watercraft, an alert made at the helm of the watercraft designed to notify the user that the watercraft is on a route to run into an obstacle in the water would be ineffective. Further, sending alerts to all areas of the watercraft could be not only inefficient but also undesirable. For example, if a first user is located at the helm of the watercraft and a second user is sleeping in the cabin of the watercraft, it would be undesirable to make an alert both at the helm and in the cabin because waking up the second user when the first user is already at the helm and available to fix the issue would be undesirable (in most situations). Thus, there is a need for systems and methods for efficiently and effectively alerting users within the watercraft.

BRIEF SUMMARY

Some example embodiments of the present invention include devices, systems, and methods for alerting a user on a watercraft in response to an occurrence of one or more triggers. As noted above, users may move about the watercraft during its operation, and triggers can occur anywhere on the watercraft. Thus, it may be difficult to determine where or how to make an alert in response to a detection of one or more triggers in both an efficient and effective manner. As further noted above, a certain trigger may be critical to one user in one location on the watercraft while being irrelevant to another user in another location on the watercraft. In this regard, making alerts everywhere on the watercraft may be undesirable (e.g., unnecessarily bothering users and/or confusing users, such as by causing all users to move to one area of the watercraft at once, which is undesirable especially in situations in which users are needed at different locations on the watercraft for the watercraft to operate optimally). For example, even when a chaotic situation may be occurring at the stern of the watercraft (such as involving the reeling-in of a fish), a user may still be needed at the helm of the watercraft to ensure that the navigation of the watercraft is handled despite the chaotic event at the stern. In some situations, a different alert may need to be sent to a user at the helm. For example, while an alert may be made to users in a cabin on the boat to indicate that help is needed with the reeling in of the fish, a different (but possibly corresponding) alert may be made to a user at the helm to indicate that the navigation should be altered to aid in the reeling-in of the fish. Thus, various embodiments of the present invention provide devices, systems, and methods that facilitate alerting users on the watercraft in an efficient and effective manner. In some embodiments, such an alert may be physical in nature, such as to further identify its importance.

Some example systems include a processor and a memory, and the processor may be configured to determine that one or more triggers have occurred. For example, the processor may identify an object within an image, recognize a system fault, detect a triggering event, and/or detect an object in a body of water. The processor may then determine, in response to the trigger(s), location(s) on the watercraft in which the trigger(s) should be reported and then directly cause one or more devices at the location(s) to perform a physical alert. The physical alert may be configured to notify a user that the trigger has occurred or is continuing to occur.

Some example systems include a processor and a memory, and the processor may be configured to determine that one or more triggers have occurred. The processor may then generate instructions corresponding to the detected trigger(s) and then send the instructions as a ping signal to a network. One or more devices may then be able to pick up the ping signal with the instructions from the network and then use the information, along with other information, to determine whether to make the instructed alert. For example, a device configured to vibrate a chair at a bow of a watercraft may decline to make an alert when instructions are sent corresponding to a catching of a fish at the stern of the watercraft and the device determines that no one is sitting in the chair. However, a device configured to vibrate a chair at the stern of the watercraft may decide to make an alert when instructions are sent corresponding to a catching of a fish at the stern of the watercraft and the device determines that there is a user sitting in the chair (which may, for example, cause the user to wake-up).

In an example embodiment, a system for alerting a user on a watercraft is provided. The system includes a processor and a memory including computer executable instructions, the computer executable instructions configured to, when executed by the processor, cause the processor to determine an occurrence of one or more triggers. Each of the one or more triggers corresponds to at least one of identifying an object within an image, recognizing a system fault, detecting a triggering event, or detecting an object in a body of water. The processor is also configured to determine, in response to the determination of the occurrence of the one or more triggers, one or more locations on the watercraft in which to report the one or more triggers and cause one or more devices at the determined one or more locations on the watercraft to perform a physical alert so as to notify a user at the determined one or more locations of the occurrence of the one or more triggers.

In some embodiments, determining the occurrence of the one or more triggers may include at least one of gathering marine data based on a marine environment, retrieving data from an external network, analyzing vessel data, determining a location of the user, retrieving previous events from the memory and determining whether the one or more triggers have occurred in a recent past, determining a status of a sensor, or retrieving a status from a marine electronic device.

In some embodiments, determining the one or more locations in which to report the one or more triggers includes at least one of communicating with at least one of a location sensor, a position sensor, or a GPS device within a mobile device to determine a location of the mobile device, determining a likely location of the user based on detected weight shifts of the watercraft, determining a weight of an object being held by a chair using a weight sensor in the chair, sending alerts to various devices positioned at different locations on the watercraft and determining which of the alerts are received, or determining that a location of the user is undetectable and determining that alerts should be sent to multiple locations on the watercraft.

In some embodiments, the physical alert may be a plurality of physical alerts that are configured to escalate based on a number of previous occurrences of the one or more triggers, and the plurality of physical alerts may be configured to escalate by the processor assigning severity levels to each occurrence and causing different alerts for each of the severity levels.

In some embodiments, the severity levels may increase based on a period of elapsed time without a detected response.

In some embodiments, the physical alert may include at least one of alteration of one or more trim tabs, vibration of one or more of a seat, a steering wheel, or a throttle, adjustment of a seat, alteration of a rudder, or modification of a power state of a pump.

In some embodiments, the physical alert may include at least one of flashing of one or more lights, vibration of one or more of a wristband, a belt, a mobile device, or a throttle, a visual alert on a heads up display, a visual alert on a marine electronic device, or alteration of an engine speed.

In some embodiments, causing the physical alert may include sending a signal to a network with specific instructions, and the specific instructions may correspond to at least one of the occurrence of the one or more triggers, the one or more locations of the one or more triggers, or the physical alert.

In some embodiments, the network may be a wired network.

In some embodiments, the network may be a wireless network.

In some embodiments, the processor may be integrated within a marine electronic device on the watercraft.

In some embodiments, the processor may be in communication with a mobile device such that the processor can cause the mobile device to vibrate or display visual alerts.

In some embodiments, detecting the triggering event may include detecting movement of an anchor.

In some embodiments, identifying the object within the image may include at least one of identifying an obstacle within the image, identifying a person within the image, or identifying an animal within the image.

In some embodiments, recognizing the system fault may include recognizing that a command from an autopilot system was not properly executed.

In some embodiments, the system fault may include recognizing that a pre-determined amount of time without user interaction has occurred after a prompt was initiated.

In another example embodiment, a device for alerting a user on a watercraft is provided. The device includes a processor and a memory including computer executable instructions, the computer executable instructions configured to, when executed by the processor, cause the processor to determine an occurrence of one or more triggers. Each of the one or more triggers corresponds to at least one of identifying an object within an image, recognizing a system fault, detecting a triggering event, or detecting an object in a body of water. The processor is also configured to determine, in response to the determination of the occurrence of the one or more triggers, one or more locations on the watercraft in which to report the one or more triggers and cause one or more devices at the determined one or more locations on the watercraft to perform a physical alert so as to notify a user at the determined one or more locations of the occurrence of the one or more triggers.

In some embodiments, determining the occurrence of the one or more triggers may include at least one of gathering marine data based on a marine environment, retrieving data from an external network, analyzing vessel data, determining a location of the user, retrieving previous events from the memory and determining whether the one or more triggers have occurred in a recent past, determining a status of a sensor, or retrieving a status from a marine electronic device.

In some embodiments, determining the one or more locations in which to report the one or more triggers may include at least one of communicating with at least one of a location sensor, a position sensor, or a GPS device within a mobile device to determine a location of the mobile device, determining a likely location of the user based on detected weight shifts of the watercraft, determining a weight of an object being held by a chair using a weight sensor in the chair, sending alerts to various devices positioned at different locations on the watercraft and determining which of the alerts are received, or determining that a location of the user is undetectable and determining that alerts should be sent to multiple locations on the watercraft.

In another example embodiment, a method of alerting a user on a watercraft is provided. The method includes determining an occurrence of one or more triggers. Each of the one or more triggers corresponds to at least one of identifying an object within an image, recognizing a system fault, detecting a triggering event, or detecting an object in a body of water. The method also includes determining, in response to the determination of the occurrence of the one or more triggers, one or more locations on the watercraft in which to report the one or more triggers and causing one or more devices at the determined one or more locations on the watercraft to perform a physical alert so as to notify a user at the determined one or more locations of the occurrence of the one or more triggers.

In another example embodiment, a system for alerting a user on a watercraft is provided. The system includes a processor and a memory including computer executable instructions, the computer executable instructions configured to, when executed by the processor, cause the processor to determine an occurrence of one or more triggers. Each of the one or more triggers corresponds to at least one of identifying an object within an image, recognizing a system fault, detecting a triggering event, or detecting an object in a body of water. The processor is also configured to generate instructions for one or more of a plurality of devices to perform an alert corresponding to the occurrence of the one or more triggers and send the instructions as a ping signal within a network to the plurality of devices such that each of the plurality of devices receive the ping signal via the network and determine whether to perform the alert based on the instructions so as to notify a user of the occurrence of the one or more triggers at a location and in a manner corresponding to that device.

In some embodiments, each of the plurality of devices may be configured to retrieve the instructions from the network, decide whether to use the instructions to perform the alert, determine, in response to a decision to use the instructions, how to report the one or more triggers, and cause the device to perform the alert.

In some embodiments, at least one of the decision whether to use the instructions to perform the alert or a determination of how to report the one or more triggers may include at least one of determining a location of the device, determining one or more locations on the watercraft in which the one or more triggers occurred, determining a location of the user, determining whether the location of the device matches at least one of the one or more locations on the watercraft in which the one or more triggers occurred or the location of the user, determining whether previous alerts have been made by the device, or determining whether a severity level has been met.

In some embodiments, determining how to report the one or more triggers may include determining one or more locations on the watercraft in which to report the one or more triggers on the watercraft and determining whether a location of the device matches any of the one or more locations in which to report the one or more triggers.

In some embodiments, each of the plurality of devices may be configured to determine, in response to a decision not to use the instructions, instructions to send to a memory of the device to indicate a previous occurrence of the one or more triggers.

In some embodiments, the alert may be at least one of a physical alert, visual alert, or audible alert.

In some embodiments, the network may be a wired network.

In some embodiments, the network may be a wireless network.

In some embodiments, determining the occurrence of the one or more triggers may include at least one of gathering marine data based on a marine environment, retrieving data from an external network, analyzing vessel data, determining a location of the user, retrieving previous events from the memory and determining whether the one or more triggers have occurred in a recent past, determining a status of a sensor, or retrieving a status from a marine electronic device.

In some embodiments, the processor may be further configured to determine whether a desired one of the plurality of devices performed the alert and determine, in response to a determination that the desired one of the plurality of devices did not perform the alert, a second occurrence of one or more second triggers. Each of the one or more second triggers may correspond to at least one of identifying an object within an image, recognizing a system fault, detecting a triggering event, or detecting an object in a body of water. The processor may further be configured to generate second instructions for one or more of the plurality of devices to perform a second alert corresponding to the second occurrence of the one or more second triggers and send the second instructions as a second ping signal within the network to the plurality of devices such that each of the plurality of devices receive the second ping signal via the network and determine whether to perform the second alert based on the second instructions so as to notify the user of the second occurrence of the one or more second triggers at a second location and in a second manner corresponding to that device.

In some embodiments, the processor may be integrated within a marine electronic device on the watercraft.

In some embodiments, the plurality of devices may include at least one of a mobile device, a smartwatch, a device on a wristband or belt, or a marine electronic device.

In some embodiments, detecting the triggering event may include detecting movement of an anchor.

In some embodiments, identifying the object within the image may include at least one of identifying an obstacle within the image, identifying a person within the image, or identifying an animal within the image.

In some embodiments, recognizing the system fault may include recognizing that a command from an autopilot system was not properly executed.

In some embodiments, the system fault may include recognizing that a pre-determined amount of time without user interaction has occurred after a prompt was initiated.

In another example embodiment, a marine electronic device for alerting a user on a watercraft is provided. The marine electronic device includes a processor and a memory including computer executable instructions, the computer executable instructions configured to, when executed by the processor, cause the processor to determine an occurrence of one or more triggers. Each of the one or more triggers corresponds to at least one of identifying an object within an image, recognizing a system fault, detecting a triggering event, or detecting an object in a body of water. The processor is further configured to generate instructions for one or more of a plurality of devices to perform an alert corresponding to the occurrence of the one or more triggers and send the instructions as a ping signal within a network to the plurality of devices such that each of the plurality of devices receive the ping signal via the network and determine whether to perform the alert based on the instructions so as to notify a user of the occurrence of the one or more triggers at a location and in a manner corresponding to that device.

In some embodiments, each of the plurality of devices may be configured to retrieve the instructions from the network, decide whether to use the instructions to perform the alert, determine, in response to a decision to use the instructions, how to report the one or more triggers, and cause the device to perform the alert.

In some embodiments, at least one of the decision whether to use the instructions to perform the alert or a determination of how to report the one or more triggers may include at least one of determining a location of the device, determining one or more locations on the watercraft in which the one or more triggers occurred, determining a location of the user, determining whether the location of the device matches at least one of the one or more locations on the watercraft in which the one or more triggers occurred or the location of the user, determining whether previous alerts have been made by the device, or determining whether a severity level has been met.

In another example embodiment, a method for alerting a user on a watercraft is provided. The method includes determining an occurrence of one or more triggers. Each of the one or more triggers corresponds to at least one of identifying an object within an image, recognizing a system fault, detecting a triggering event, or detecting an object in a body of water. The method also includes generating instructions for one or more of a plurality of devices to perform an alert corresponding to the occurrence of the one or more triggers and sending the instructions as a ping signal within a network to the plurality of devices such that each of the plurality of devices receive the ping signal via the network and determine whether to perform the alert based on the instructions so as to notify a user of the occurrence of the one or more triggers at a location and in a manner corresponding to that device.

BRIEF DESCRIPTION OF THE SEVERAL VIEWS OF THE DRAWING(S)

Reference will now be made to the accompanying drawings, which are not necessarily drawn to scale, and wherein.

DETAILED DESCRIPTION

Figure 1:
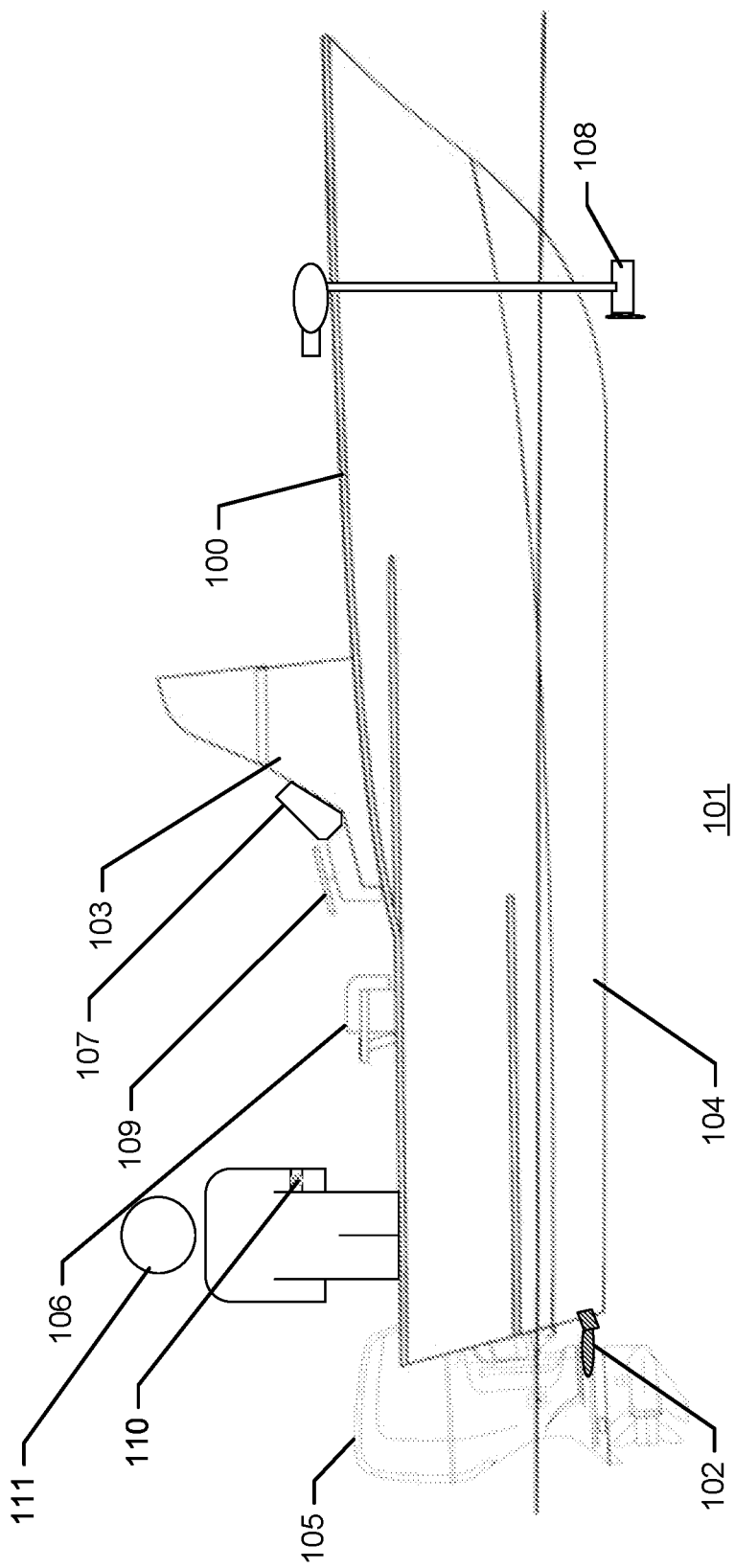
FIG. 1 shows an example watercraft with a user wearing an example smartwatch that is compatible with an example alert system, in accordance with some embodiments described herein.

Exemplary embodiments of the present disclosure will be described more fully hereinafter with reference to the accompanying drawings, in which some, but not all embodiments of the present disclosure are shown. Indeed, the present disclosure may be embodied in many different forms and should not be construed as limited to the exemplary embodiments set forth herein; rather, these embodiments are provided so that this disclosure will satisfy applicable legal requirements. Like reference numerals refer to like elements throughout.

As depicted in FIG. 1, a watercraft 100 (e.g., a vessel) configured to traverse a marine environment, e.g., body of water 101, may include one or more devices, such as the smartwatch 110 on the user 111, disposed on and/or proximate to the watercraft 100. The watercraft 100 may be a surface watercraft, a submersible watercraft, or any other implementation known to those skilled in the art. The one or more devices may each be configured to alert a user upon an occurrence of one or more triggers. In some embodiments, as will be described in more detail herein, the one or more devices may selectively make alerts based on the occurrence of the one or more triggers based on factors such as, but not limited to, location(s) of the one or more triggers, a location of the device, and/or a location of the user.

Depending on the configuration, the watercraft 100 may include a main propulsion motor 105, such as an outboard or inboard motor. Additionally, the watercraft 100 may include a trolling motor 108 configured to propel the watercraft 100 or maintain a position. Other propulsion methods are also contemplated, such as thrusters, among others. One or more transducer assemblies (e.g., 102) may be mounted in various positions and to various portions of the watercraft 100 and/or equipment associated with the watercraft 100. For example, a transducer assembly may be mounted to the transom of the watercraft 100, such as depicted by transducer assembly 102. Additionally or alternatively, a transducer assembly may be mounted to the bottom or side of the hull 104 of the watercraft 100 or to the trolling motor 108.

The watercraft 100 may also include one or more marine electronic devices 107, such as may be utilized by a user to interact with, view, or otherwise control various aspects of the watercraft and its various marine systems described herein. In the illustrated embodiment, the marine electronic device 107 is positioned on a console 103 proximate the helm (e.g., steering wheel 109) of the watercraft 100—although other places on the watercraft 100 are contemplated. Likewise, additionally or alternatively, a user's mobile device may include functionality of a marine electronic device.

As mentioned, the watercraft 100 may include one or more devices. In some embodiments, the one or more devices may be mobile devices (e.g., smartwatches such as the smartwatch 110 or smartphones). Further, the one or more devices may also include other devices such as eyeglasses, sunglasses, binoculars, a belt, or any other device that is connectable (or can be made to be connectable) to a system such as one of those described herein. The one or more devices may additionally or alternatively include other alert devices that are designed to vibrate, shake, or create any other physical, audible, or visual alert. For example, a vibration actuator may be included within a chair 106 on the watercraft 100 such that the chair 106 vibrates, shakes, or otherwise moves (e.g., adjusts in direction, height, or angle) when one or more triggers are detected and thus an alert is caused. Similarly, an actuator within the steering wheel 109 may cause the steering wheel 109 to vibrate or shake in response to a detection of one or more triggers. Other alerts, such as involving lights and/or speakers, may also be included, as will be described in more detail herein.

The one or more devices may be in communication with a system including a processor, and the processor may or may not be integrated into the marine electronic device 107 on the watercraft 100. The system may first be configured to detect an occurrence of one or more triggers. For example, the system may identify an object within an image obtained using the transducer assembly 102 and then determine that the identity of the object identified is, for example, a type of desired fish found near the watercraft 100. In some embodiments, identifying the object within the image may include identifying an obstacle within the image, identifying a person within the image, and/or identifying an animal within the image. As another example, the system may recognize a system fault such as the watercraft 100 failing to respond to or execute a command from an autopilot navigation system. A system fault may also or alternatively include recognizing that a pre-determined amount of time without user interaction has occurred after a prompt was initiated. Further, the system may detect another triggering event such as detecting a catching of a fish on a fishing line that is connected to the watercraft 100, detecting movement of an anchor, or detecting a weather alert. The system may also be configured to detect an object in the body of water 101 and determine that a trigger has occurred. Other triggers and triggering methods are also contemplated, such as those involving cameras or video footage, for example.

In determining the occurrence of the one or more triggers, the system may use any type of data either on the watercraft 100, associated with the watercraft 100, or completely external from the watercraft 100. For example, the system may gather marine data based on a marine environment, retrieve data from an external network, analyze vessel data, and/or determine a location of a user to make a determination of an occurrence of one or more triggers. Additionally or alternatively, the system may retrieve previous events from memory and determine whether the one or more triggers have occurred in a recent past. Moreover, the system may additionally or alternatively determine a status of a sensor and/or retrieve a status from a marine electronic device. Other types of data are also contemplated.

In some example embodiments, the system may be configured to determine, in response to the determination of the occurrence of the one or more triggers, one or more locations on the watercraft 100 in which the one or more triggers should be reported and then cause one or more devices at the determined one or more locations on the watercraft 100 to perform an alert, such as a physical alert so as to notify the user 111 at the determined one or more locations of the occurrence of the one or more triggers. For example, the processor of the system may be located within the marine electronic device 107 on the watercraft 100, and the marine electronic device 107 may be configured to detect a presence of a desired fish type using the sonar transducer assembly 102. When the desired fish type is detected as being below or proximate the watercraft 100 by the processor, which is in communication with the sonar transducer assembly 102, the system may make a determination that a trigger has occurred and then send instructions to the smartwatch 110 to vibrate and alert the user 111 of the occurrence of the trigger.

In some embodiments, the system may communicate with at least one of a location sensor, a position sensor, or a GPS device within a mobile device to determine one or more locations in which the one or more triggers should be reported. Further, the system may be configured to determine a likely location of the user based on detected weight shifts of the watercraft 100 or may determine a weight of an object being held by a chair using a weight sensor in the chair. Additionally or alternatively, the system may send alerts to various devices positioned at different locations on the watercraft 100 and then determine which of the alerts are received, and/or the system may determine that a location of the user is undetectable and then determine that alerts should be sent to multiple locations on the watercraft 100 (e.g., to the most likely locations in which a user might be located, such as the helm, and/or to locations in which the trigger(s) are occurring).

In some embodiments, after the one or more triggers have been determined, the system may additionally or alternatively be configured to generate instructions for one or more devices to perform an alert corresponding to the occurrence of the one or more triggers and then send the instructions as a ping signal within a network to the one or more devices. The network may be a wired network or a wireless network. Each of the devices may receive the ping signal via the network and then be configured to determine whether to perform the alert based on the instructions. Devices that decide to perform the alert then notify a user of the occurrence of the one or more triggers at a certain location and in a manner corresponding to that device. The alert may be at least one of a physical alert, visual alert, or audible alert.

For example, the processor of the system may be located within the marine electronic device 107 on the watercraft 100, and the marine electronic device 107 may be configured to detect a presence of a desired fish type using the sonar transducer assembly 102. When the desired fish type is detected as being below or proximate the watercraft 100 by the processor, which is in communication with the sonar transducer assembly 102, the system may make a determination that a trigger has occurred and then send a ping signal to a network. The smartwatch 110 may then receive the ping signal from the network and then decide, using factors such as severity level, user settings, locations of the user 111, locations of the watercraft 100, and/or locations of the occurrence of the trigger(s), whether to cause the smartwatch 110 to vibrate and alert the user 111 of the occurrence of the trigger.

Figure 2:
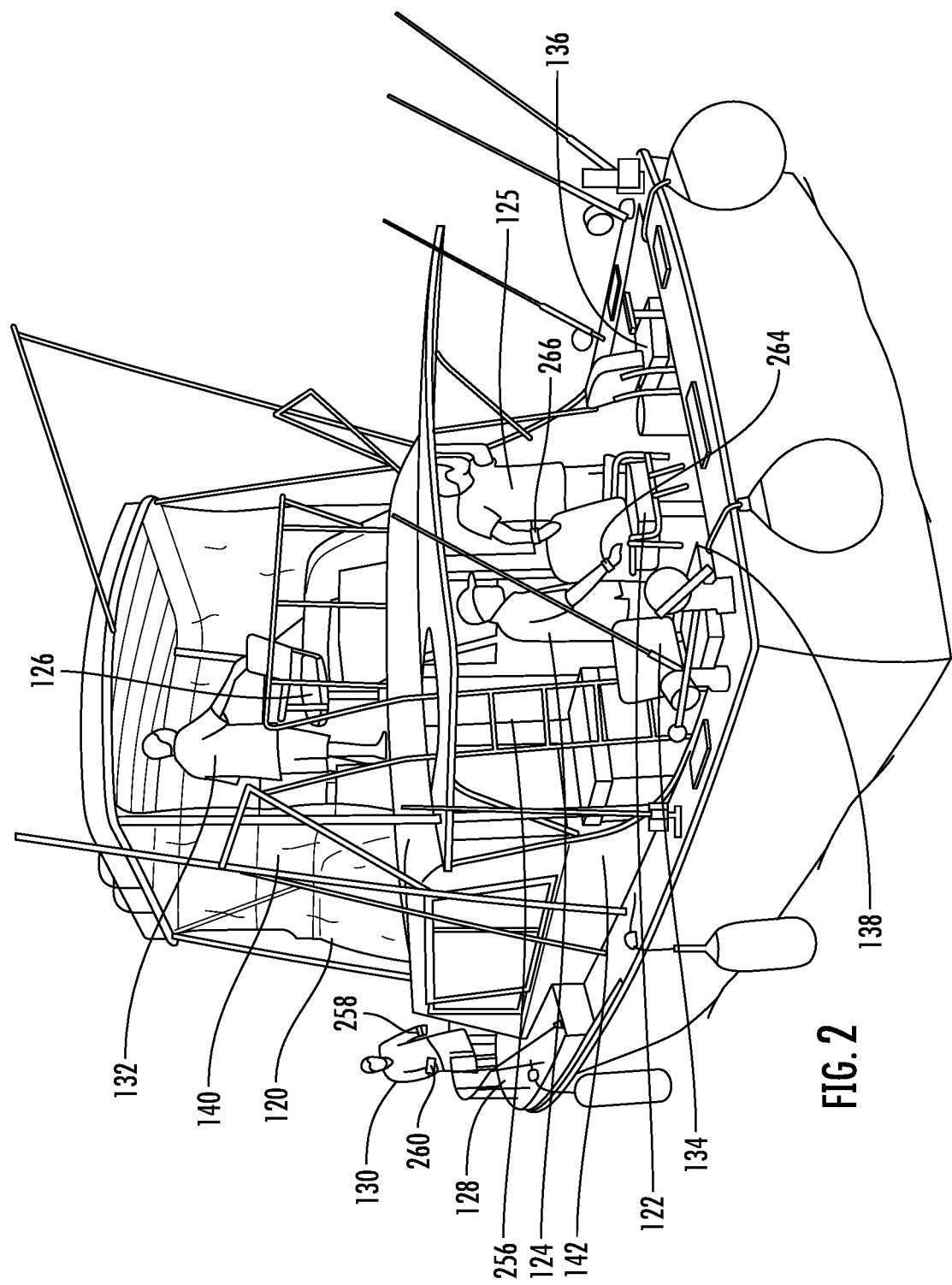
FIG. 2 shows another example watercraft with multiple example devices configured to communicate with an example alert system, in accordance with some embodiments described herein.

FIG. 2 illustrates a watercraft 120 with a first level 142 and a second level 140. The first level 142 defines a bow area 128 and a stern area 138. The watercraft 120 is carrying a first user 124, a second user 125, and a third user 130 on the first level 142 and a fourth user 132 on the second level 140. Further, the watercraft 120 also includes a first chair 126, a second chair 134, a third chair 122, and a fourth chair 136. While the first chair 126 may be for a driver of the watercraft 120 at the helm on the second level 140, the second chair 134, the third chair 122, and the fourth chair 136 may be for other purposes. For example, the third chair 122 may be a fighting chair, which is a type of chair commonly installed into a stern of a watercraft for helping a user reel a fish into the watercraft.

The systems disclosed herein may have one or multiple levels. For example, the second level 140 of the watercraft 120 in FIG. 2 is a flybridge containing a helm. In other embodiments, the systems disclosed herein may be configured for use with watercrafts with only one level or with watercrafts with more and/or differently configured levels than those shown in FIG. 2.

Still referring to FIG. 2, the first user 124 is wearing a first smartwatch 264, the second user 125 is wearing a second smartwatch 266, and the third user 130 is wearing a third smartwatch 258. The fourth user 132 is not wearing a smartwatch. The third user 130 is also holding a smartphone 260. The first smartwatch 264, the second smartwatch 266, the third smartwatch 258, and the smartphone 260 may be some of the one or more devices on the watercraft 120 that are configured to interact with the notification system, as described herein. For example, the first smartwatch 264, the second smartwatch 266, the third smartwatch 258, and the smartphone 260 may be used to determine or at least estimate locations of the users when determining whether alerts should be made at certain locations. However, the systems described herein may be able to use other devices and/or systems to detect locations of the user on the watercraft 120 (especially in cases in which a user is not wearing a smartwatch or holding a smartphone). For example, the user 132 is standing at the helm on the second level 140, and the user 132 is not wearing a smartwatch. A system or device may try one of various methods to determine if the user 132 is at the helm. A sensor in the chair 126 would not detect the presence of the user 132 at the helm because the user 132 is not sitting in the chair 126. The user 132 is not wearing a smartwatch and does not appear to have a smartphone, so neither of those methods would help detect the presence of the user 132 at the helm. In some embodiments, the system may detect that the user 132 has recently made manual adjustments to a steering wheel or throttle (or any other device or system at the helm) and then determine that the user 132 is at the helm based on those detected manual adjustments.

As mentioned, a device may be installed within or onto one of the chairs (e.g., one of the first chair 126, the second chair 134, the third chair 122, and the fourth chair 136). For example, the first chair 126 may include an actuator within a sitting area of the first chair 126. The actuator may be designed to vibrate or shake the first chair 126 in response to an instruction from a processor and/or a network. Additionally, the first chair 126 may include, whether separately or integrated within the actuator, a sensor configured to detect whether a predetermined amount of weight is placed on the chair. In some embodiments, the sensor may be integrated within a system such that the system looks for, e.g., a location of a smartwatch being worn by a user or recent use of a steering wheel and/or throttle, among other things, to validate whether the weight being detected is a person or an object.

Additionally, some watercraft may have a cabin such as the cabin 256 on watercraft 120. When a user is located in the cabin 256, it may be difficult to make an alert to the user. Thus, a mobile device such as a smartwatch or a smartphone may be used. Further, the systems described herein may also incorporate sensors such as a movement sensor in a threshold of a door into the cabin to determine whether a user is located in the cabin. Other detection methods are also contemplated. The systems may also be configured to determine whether an alert should be notified to a person in the cabin. For example, if the system has already determined that a person is sitting in the chair 126 at the helm and the trigger is a detection of a rock in the path of the watercraft 120, alerting a user within the cabin 256 may be unnecessary. However, if the trigger is a fish being caught on a fishing line connected to the watercraft 120, it may be very necessary to alert the user that is within the cabin 256 because catching a fish is an event that may suddenly require multiple tasks to be completed immediately.

Figure 3:
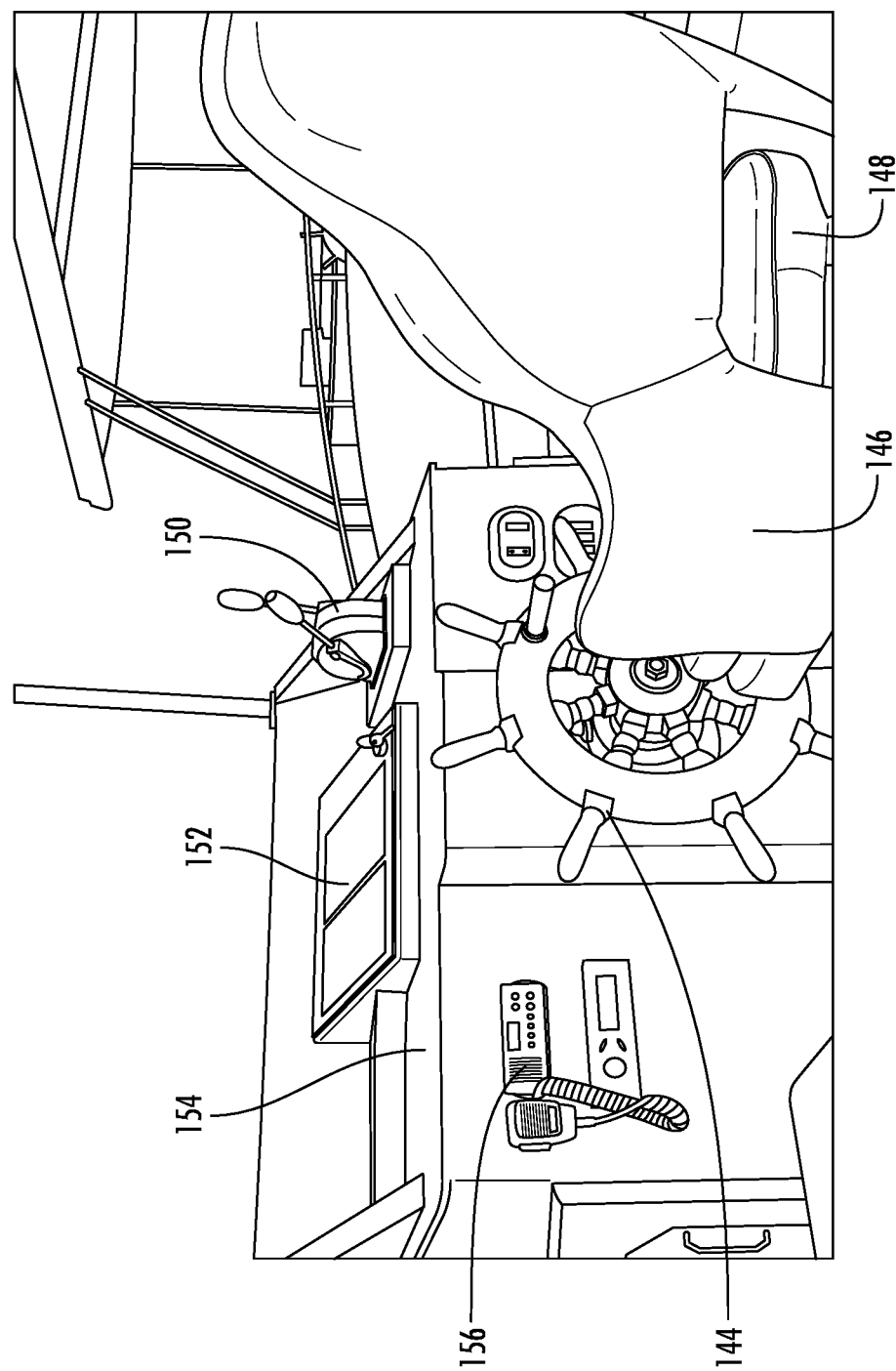
FIG. 3 shows a helm of another example watercraft, in accordance with some embodiments described herein.

FIG. 3 is a zoomed-in view of a helm of a watercraft. The helm of the watercraft includes a console 154, a chair 146 with a sitting area 148, a steering wheel 144, a pair of throttles 150, a radio 156, and a display system 152. As mentioned, the chair 146 (e.g., the sitting area 148 of the chair), the pair of throttles 150, and/or the steering wheel 144 may each include actuators configured to cause shaking or vibration when engaged. The chair 146 may also include a weight sensor in the sitting area 148 for determining whether a use of a certain weight is sitting in the chair 146. The weight sensor may be incorporated with the actuator or may be separate from the actuator. Further, the vibration or shaking of one or more of the chair 146 (e.g., the sitting area 148 of the chair), the pair of throttles 150, and/or the steering wheel 144 may be accompanied in some embodiments by alerts using the display system 152 and/or the radio 156. For example, if the occurrence of the trigger is critical and/or the severity level is determined to be high (e.g., because previous alerts have been ignored and/or because the occurrence of the one or more triggers is being repeated), the system may be configured to cause the chair 146 to vibrate and cause a visual alert to fill the screen(s) of the display system 152 at the same time. Further, the system may additionally cause an audio alert through the radio 156.

Figure 4:
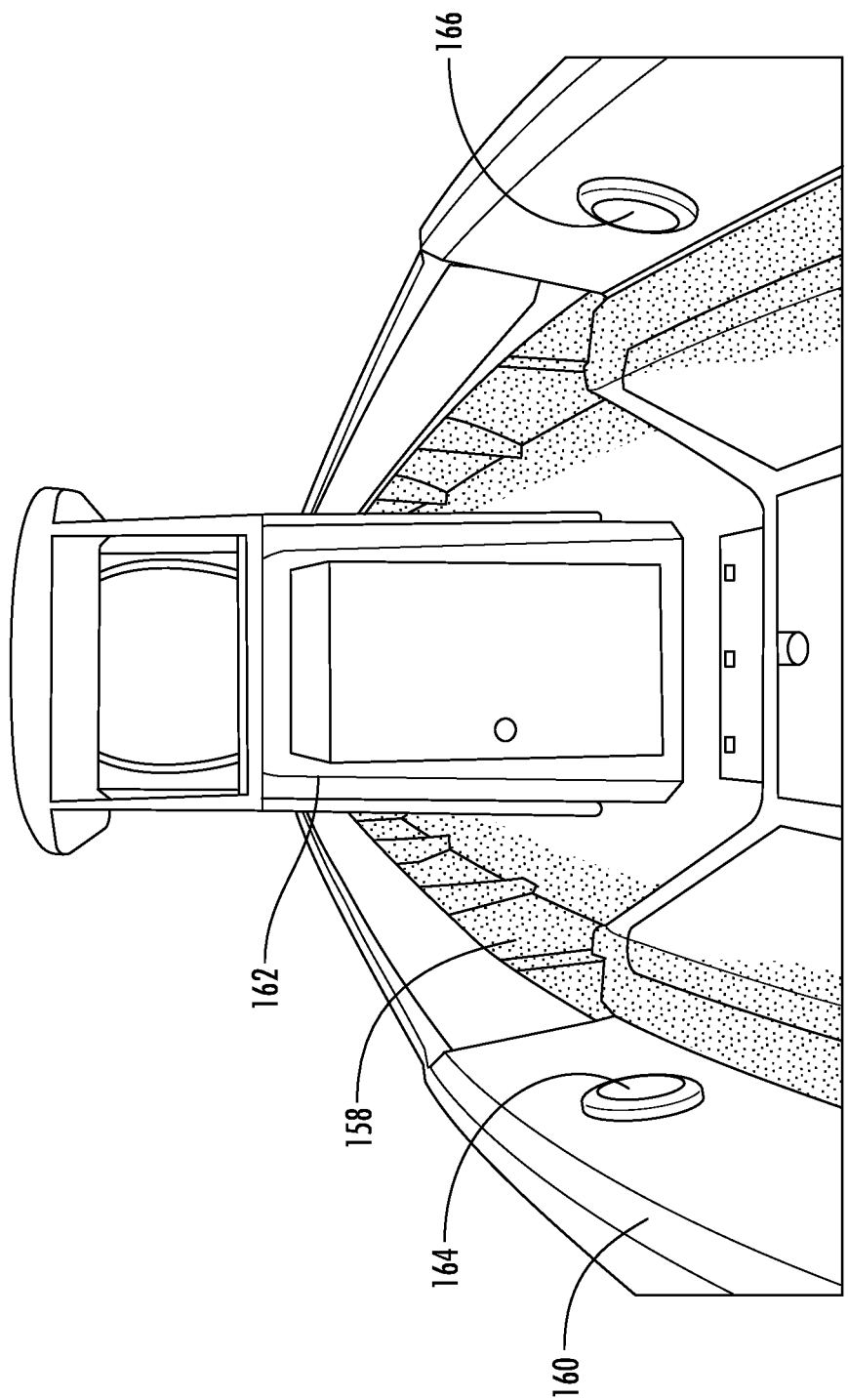
FIG. 4 shows a front view of another example watercraft with internal lighting and speakers, in accordance with some embodiments described herein.

FIG. 4 illustrates a front view of another watercraft 160 with a center console 162. The watercraft 160 has internal lighting 158, a first speaker 164, and a second speaker 166. In some embodiments, alerts may involve flashing and/or changing a color of the internal lighting 158. This may be useful, for example, in situations in which the watercraft is moving at a high speed (e.g., early in the morning before the sun has risen), and vibrations in a chair may be harder for a user to notice because the watercraft 160 is already vibrating due to its high speed. Additionally or alternatively, the first speaker 164 and/or the second speaker 166 may be used to catch the user's attention. In some embodiments, a system may cause alerts in a chain-like manner until the user responds (e.g., vibrate a chair, sound the first speaker 164 and/or the second speaker 166, and then flash the internal lighting 158), or in some other embodiments, a system may be configured to simultaneously cause various alerts at once. For example, if the trigger is critical enough, a system may be configured to cause a chair to vibrate, sound the first speaker 164 and the second speaker 166, and flash or change the color of the internal lighting 158 at once to catch a user's attention, e.g., when the watercraft 160 is moving at a high speed in the early morning before the sun has risen.

It should be appreciated that the alert(s) made by the one or more device(s) in the systems and methods disclosed herein may take on any form. For example, the alerts may be physical alerts such as altering one or more trim tabs, vibrating a seat of a chair, vibrating a steering wheel, vibrating a throttle, adjusting a seat of a chair, altering a rudder, or modifying a power state of a pump (e.g., turning a bilge pump on and off until a user notices). Additionally or alternatively, alerts may involve flashing one or more lights, vibrating a wristband, vibrating a belt, vibrating a mobile device, vibrating a throttle, causing a visual alert on a heads up display, causing a visual alert on a marine electronic device, or altering an engine speed. Other alerts are also contemplated, such as those related to heating and/or cooling a chair, shocking a user, or the like.

Further, the systems described herein may be configured to determine severity levels of alerts and/or to escalate alerts. For example, a physical alert may, in some embodiments, be a plurality of physical alerts that are configured to escalate based on a number of previous occurrences of the one or more triggers. The plurality of physical alerts may be configured to escalate by the processor assigning severity levels to each occurrence and causing different alerts for each of the severity levels. For example, the severity levels may be configured to increase based on a period of elapsed time without a detected response.

Moreover, the one or more devices may include any type of device. For example, in some embodiments, the one or more devices may include a mobile device, a smartwatch, a device on a wristband or belt (such as a fighting belt), or a marine electronic device, but in other embodiments, the one or more devices may additionally or alternatively include various sensors on or near a watercraft, actuators, an autopilot navigation assembly, or any other device or system.

Figure 5:
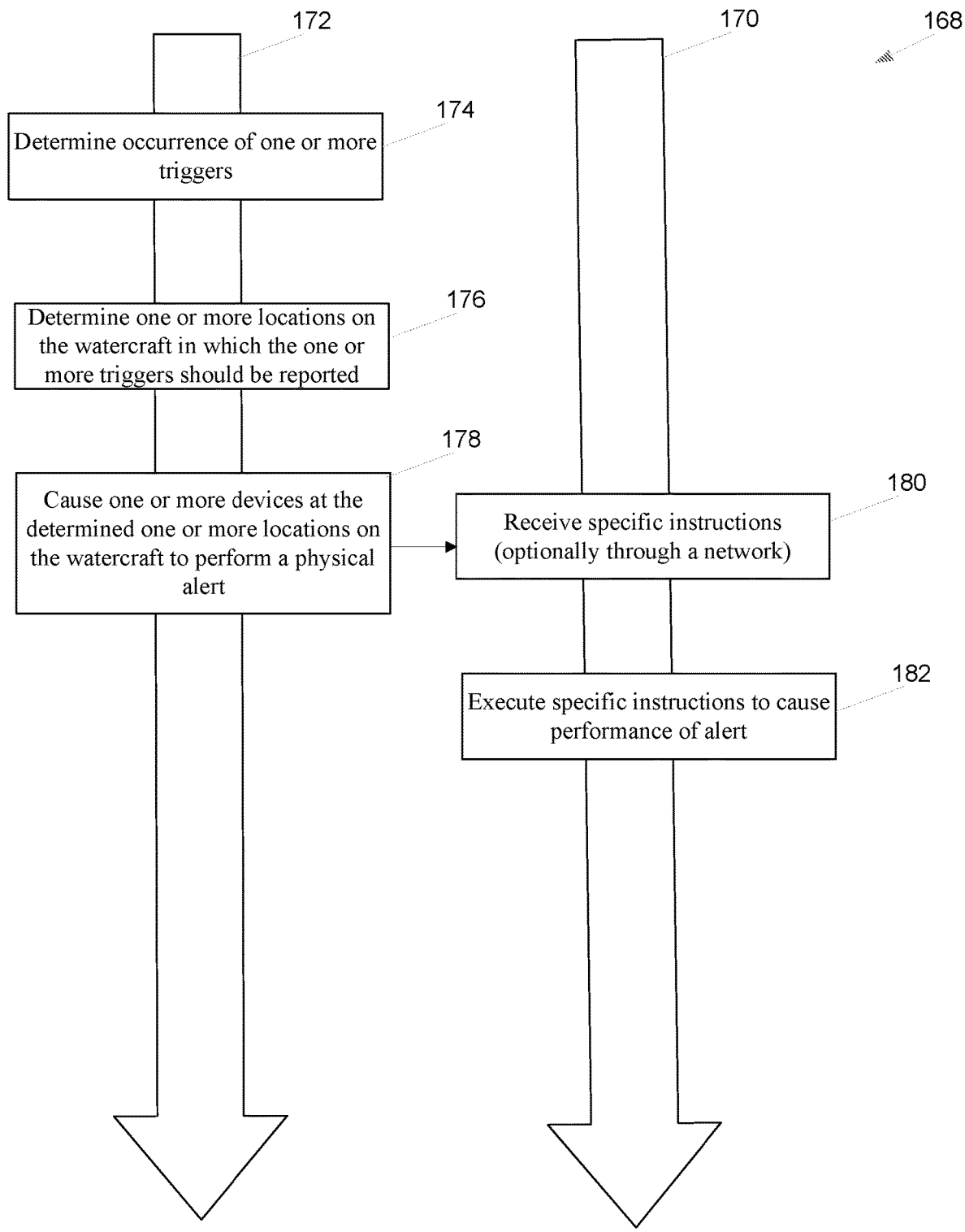
FIG. 5 shows a timeline diagram of an example system in communication with a device to facilitate an alert, in accordance with some embodiments described herein.

FIG. 5 is a diagram showing a timeline 168 of a system 172 and a device 170. In some embodiments, the system 172 may, in some embodiments, be integrated within a marine electronics device such as the marine electronic device 107 of FIG. 1, but in some other embodiments, the system 172 may be located elsewhere or may be a standalone unit. The system 172 may be in communication with one or more devices (such as mobile devices, sensors, or other elements) such that it is able to determine an occurrence of one or more triggers in relation to a watercraft at operation 174. For example, determining the one or more triggers may include determining that debris is moving towards the watercraft. At operation 176, the system 172 may be configured to determine one or more locations on the watercraft in which the one or more triggers that were determined at operation 174 should be reported. For example, at operation 176, the system 172 may be configured to determine that alerts indicating that the debris is moving toward the watercraft should be reported at the helm and at the fighting chair in the stern area of the watercraft, after a determination that a user is sitting in the fighting chair at the stern area of the watercraft. The purpose of the alert being sent to the fighting chair at the stern area of the watercraft may be because the system 172 is unable to detect whether a user is sitting in the chair at the helm (e.g., there may be only one user on the watercraft, and the one user may be in the fighting chair). An alert may also be sent to the helm in case there is a user at the helm (because the user at the helm would be able to quickly divert from the debris coming towards the watercraft). At operation 178, the system 172 may be configured to cause one or more devices at the determined one or more locations on the watercraft to perform a physical alert. For example, operation 178 may involve sending specific instructions to vibrate a throttle and/or steering wheel at the helm and to vibrate an actuator within the fighting chair at the stern of the watercraft.

At operation 180, the device 170 may be configured to receive the specific instructions from the system 172. The specific instructions may, for example, correspond to the occurrence of the one or more triggers, to the one or more locations of the one or more triggers, and/or to the physical alert. In some embodiments, the instructions may be received directly from a processor of the system, but in some other embodiments, the instructions may be sent and received through a network that is either wired or wireless. The device 170 may then be configured to execute the specific instructions to cause performance of the physical alert at the determined location so as to notify a user of the occurrence of the one or more triggers. For example, the device 170 may be an actuator in a throttle, steering wheel, or chair on a watercraft, such as in the foregoing example, and the actuator may be configured to execute the specific instructions sent to it by vibrating or shaking for a specified amount of time at a specified intensity.

Figure 6:
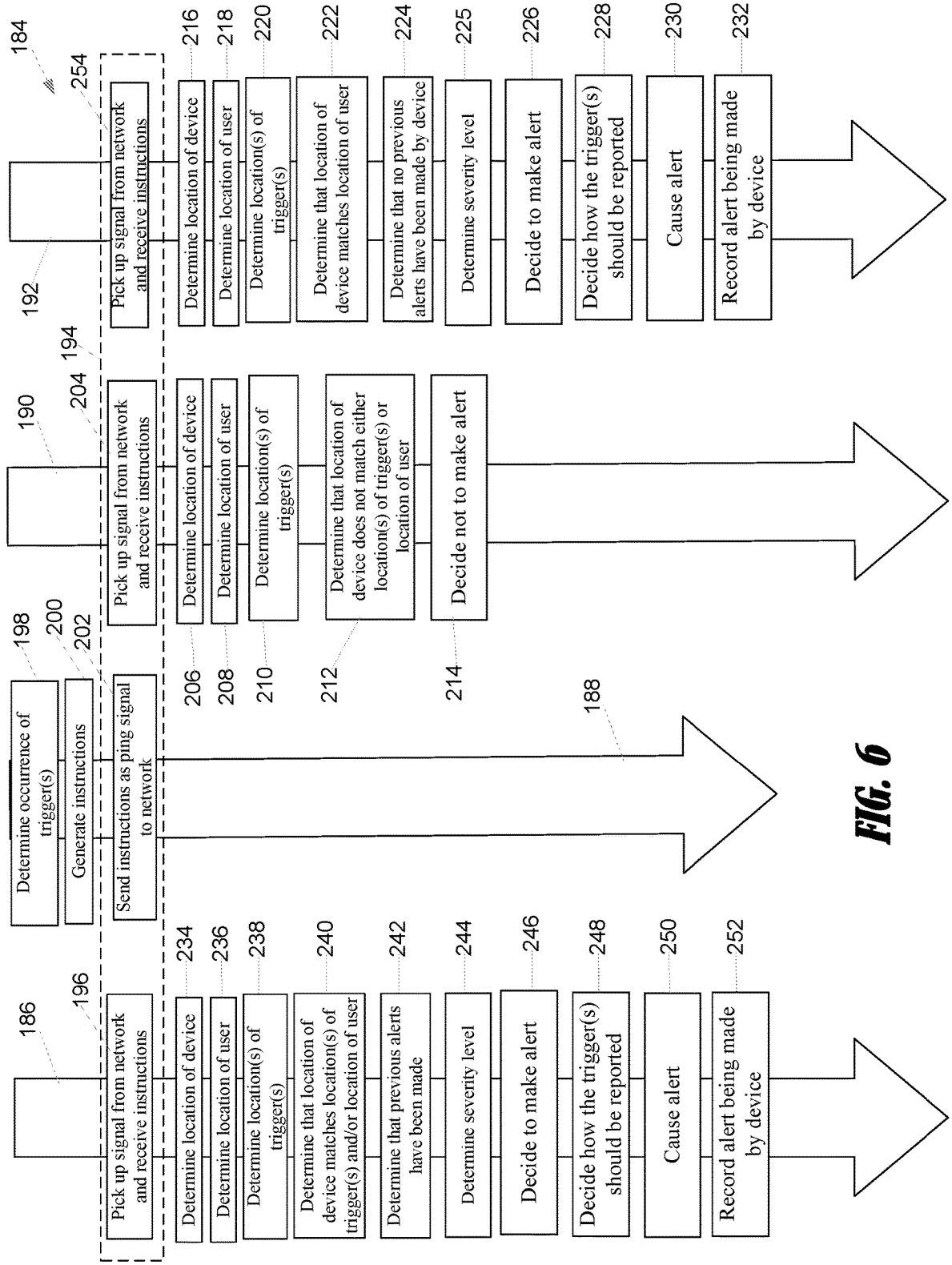
FIG. 6 shows an example timeline diagram of another example system in communication with three devices through a network to enable each of the three devices to determine whether to make an alert, in accordance with some embodiments described herein.

FIG. 6 is a diagram showing a timeline 184 of a system 188 that is connected to a first device 186, a second device 190, and a third device 192 through a network 194. The system 188 may include a processor and may or may not be integrated within, e.g., a marine electronic device. The system 188 may be in communication with one or more devices (such as mobile devices, sensors, or other elements) such that it is able to determine an occurrence of one or more triggers in relation to a watercraft at operation 198. For example, determining the one or more triggers may include determining that three jet skis are moving toward the watercraft while a fish is biting on a fishing line of the watercraft. At operation 200, the system 188 may be configured to generate instructions for one or more of a plurality of devices to perform an alert corresponding to the occurrence of the one or more triggers that were determined at operation 198. For example, the system 188 may be configured to generate instructions to alert users detected as being responsible for navigating the watercraft away from the three jet skis and to also alert users detected as being responsible for the reeling in of the fish. At operation 202, the system 188 may be configured to send the instructions as a ping signal within the network 194 to the plurality of devices that are in communication with the network 194 (e.g., first device 186, second device 190, and third device 192) such that each of the plurality of devices receives the ping signal via the network 194 and determines whether to perform the alert based on the instructions.

In some embodiments, the system 188 may be part of a marine electronic device, and the marine electronic device may be configured to send the ping signal to a network that may or may not be local to the watercraft and that is accessible by various devices such as smartwatches, smartphones, actuators, and sensors, among other things on or near the watercraft. Other configurations are also contemplated.

At operation 196, the first device 186 may be configured to pick up the ping signal from the network 194 and receive the instructions. The first device 186 may then be configured to decide whether to perform the alert based on the instructions so as to notify a user of the occurrence of the one or more triggers. Further, the first device 186 may be configured to make the alert at a location and in a manner corresponding to the first device 186. In some embodiments, the first device 186 may, in some embodiments, determine a location of the first device 186 at operation 234. For example, the first device 186 may be a smartphone, and the smartphone may, at operation 234, determine the location of the smartphone, e.g., in relation to a helm of the watercraft and/or in relation to other smart devices on the watercraft to determine, e.g., whether the smartphone belongs to a user that is responsible for navigating the watercraft and/or to determine if the smartphone is or is one of the devices on the watercraft that is closest to the helm. While the location of the first device 186 may not matter in some embodiments, in other embodiments, the location of the first device 186 may dictate whether the user who is purportedly holding the first device 186 should be notified.

Similarly, the first device 186 may, at operation 236, attempt to determine the location of the user to, e.g., determine whether the user is holding the first device 186 (e.g., the smartphone). For example, the smartphone may communicate with a smartwatch owned by the same user to determine whether the smartphone and the smartwatch are in a same location, indicating that the user is in fact holding the smartphone. The location of the user with respect to the first device 186 may dictate whether the user who is purportedly holding the first device 186 should be notified. For example, if the user were determined to not be holding the smartphone, it would not be useful for the smartphone to make an alert. However, if the user were determined to be holding the smartphone, it would be useful for the smartphone to make an alert.

Similarly, the first device 186 may, at operation 238, determine the location(s) of the one or more trigger(s), to determine if the first device 186 is one of the devices on the watercraft that is closest to the location(s) of the one or more trigger(s). For example, in the example in which the first device 186 is a smartphone and there are three jet skis traveling toward the watercraft while a fish is biting on a fishing line of the watercraft, the locations of the triggers are at the helm (e.g., the navigation system, which is how the user can navigate around the three jet skis) and at the stern of the watercraft (e.g., the fish is biting on a line coming from the stern of the watercraft). While the location(s) of the one or more trigger(s) may not matter in some embodiments, in other embodiments, the location(s) of the one or more trigger(s) may dictate whether the user who is purportedly holding, wearing, or near the first device 186 should be notified.

The first device 186 may further be configured to, at operation 240, determine whether the location of the first device 186 matches the location(s) of the one or more trigger(s) and/or the location of the user, as determined at one or more of operation 234, operation 236, and/or operation 238. In the embodiment shown in FIG. 6, the first device 186 determines that the location of the first device 186 matches the location(s) of trigger(s) and/or the location of the user at operation 240. For example, in the example in which the first device 186 is a smartphone and there are three jet skis traveling toward the watercraft while a fish is biting on a fishing line of the watercraft, the first device 186 may be being held by a user located at the stern of the watercraft, wearing a smartwatch (which confirmed his location), and located within a certain radius of the helm. In that example, the first device 186 would determine at operations 234, 236, and 238 that the first device 186 is at the stern of the watercraft, that the user is holding the first device 186 because the user is located in the same location as the first device 186 (e.g., the user's smartwatch is in the same location as the first device 186), and that the locations of the triggers are at the helm (e.g., the navigation system, which is how the user can navigate around the three jet skis) and at the stern of the watercraft (e.g., the fish is biting on a line coming from the stern of the watercraft). The first device 186 may then determine at operation 240 that the first device 186 is in a position to make an alert because the first device 186 is at the stern of the watercraft, because the user is holding the first device 186, and because the user being located at the stern of the watercraft is within a radius of proximity of the helm, which is close enough to be notified of the three jet skis coming at the watercraft.

The first device 186 may then determine whether previous alerts have been made by the first device 186 at operation 242 and then determine a severity level of the alert circumstance at operation 244. For example, if the first device 186 determines that it has already made two previous alerts for the same reason (e.g., because of the three jet skis coming towards the watercraft and/or because of the fish biting on the line coming from the stern of the watercraft) at operation 242, the first device 186 may determine a higher severity level at operation 244. Further, even if the first device 186 has not made any previous alerts, other factors may cause the first device 186 to determine a higher severity level at operation 244. For example, the fact that a fish is biting on a line may dictate a low severity level, but the fact that three jet skis are coming toward the watercraft at the same time as the fish biting on the line may cause the first device 186 to determine a higher severity level at operation 244. The first device 186 may also communicate with the network 194 to obtain additional data from external locations and/or other devices to better determine whether previous alerts have been made (by the first device 186 or by any other device) at operation 242 and to then determine a severity level of the alert circumstance at operation 244.

At operation 246, the first device 186 may decide to make the alert, and then at operation 248, the first device 186 may decide how the trigger(s) should be reported. For example, in the example in which the first device 186 is a smartphone and there are three jet skis traveling toward the watercraft while a fish is biting on a fishing line of the watercraft, the first device 186 may determine based on the severity level and the location of the user and first device 186 that it should vibrate and/or shake while also producing an audible sound and flashing a light. The audible sound may tell the user, for example, to travel to the helm to adjust the navigation path of the watercraft. If the first device 186 detects that another user is closer to the helm than the user holding the first device 186, however, the first device may determine that the user needs to help with the reeling in of the fish and may determine the mode of the alert accordingly. Other methods of alerting the user with the first device 186 are contemplated.

The first device 186 may then cause the alert at operation 250 and then, in some embodiments, record the alert being made by the first device 186 at operation 252. Further, in some embodiments, the recordation of the alert by the first device 186 at operation 252 may be communicated back to the network 194 such that, e.g., severity levels can be more accurately determined by other devices.

At operation 204, the second device 190 may be configured to pick up the ping signal from the network 194 and receive the instructions. The second device 190 may then be configured to decide whether to perform the alert based on the instructions so as to notify a user of the occurrence of the one or more triggers. Further, the second device 190 may be configured to make the alert at a location and in a manner corresponding to the second device 190. In some embodiments, the second device 190 may, in some embodiments, determine a location of the second device 190 at operation 206. For example, the second device 190 may be a device within a chair, and the device within the chair may, at operation 206, determine the location of the chair, e.g., in relation to the watercraft and/or in relation to other devices on the watercraft to determine whether the device within the chair is within a desired area for the alert. As a further example, the chair may be located at a bow of the watercraft, and the device within the watercraft may be configured to determine that the chair (and the device therewithin) is located at the bow of the watercraft at operation 206. While the location of the second device 190 may not matter in some embodiments, in other embodiments, the location of the second device 190 may dictate whether the user who is purportedly holding the second device 190 should be notified.

Similarly, the second device 190 may, at operation 208, attempt to determine the location of the user to, e.g., determine whether the user is near the second device 190 (e.g., determine whether the user is sitting in the chair). For example, the device within the chair may include a sensor configured to detect whether a weight of, e.g., greater than 90 pounds is disposed within the chair. Additionally or alternatively, the device within the chair may communicate with a smartwatch worn by a user to determine whether the device within the chair and the smartwatch are in a same location, indicating that the user is in fact siting in or standing near the chair. The location of the user with respect to the second device 190 may dictate whether the user who is purportedly on or near the second device 190 should be notified. For example, if the user were determined to not be sitting in the chair and/or smartwatch data showed that the user was located elsewhere, it would not be useful for the device within the chair to make an alert. However, if the user were determined to be standing near the chair (perhaps with a leg and/or a knee of the user placed thereon), it may be useful for the device within the chair to make an alert even if the sensor is not detecting a weight of greater than 90 pounds being exerted on the chair.

Similarly, the second device 190 may, at operation 210, determine the location(s) of the one or more trigger(s), to determine if the second device 190 is one of the devices on the watercraft that is closest to the location(s) of the one or more trigger(s). For example, in the example in which the second device 190 is a device within a chair at the bow of the watercraft and there are three jet skis traveling toward the watercraft while a fish is biting on a fishing line of the watercraft, the locations of the triggers are at the helm (e.g., the navigation system, which is how the user can navigate around the three jet skis) and at the stern of the watercraft (e.g., the fish is biting on a line coming from the stern of the watercraft). While the location(s) of the one or more trigger(s) may not matter in some embodiments, in other embodiments, the location(s) of the one or more trigger(s) may dictate whether the user who is purportedly near or on the second device 190 should be notified.

The second device 190 may further be configured to, at operation 212, determine whether the location of the second device 190 matches the location(s) of the one or more trigger(s) and/or the location of the user, as determined at one or more of operation 206, operation 208, and/or operation 210. In the embodiment shown in FIG. 6, the second device 190 determines that the location of the second device 190 does not match the location(s) of trigger(s) and/or the location of the user at operation 212. For example, in the example in which the second device 190 is a device within a chair and there are three jet skis traveling toward the watercraft while a fish is biting on a fishing line of the watercraft, the second device 190 may be within a chair at the bow of the watercraft. In that example, the second device 190 would determine at operations 206, 208, and 210 that the second device 190 is at the bow of the watercraft, that the user is not on or near the second device 190 because the user's smartwatch is located elsewhere and the sensor of the device within the chair is not detecting a weight of greater than 90 pounds, and that the locations of the triggers are at the helm (e.g., the navigation system, which is how the user can navigate around the three jet skis) and at the stern of the watercraft (e.g., the fish is biting on a line coming from the stern of the watercraft). The second device 190 may then determine at operation 212 that the second device 190 is not in a position to make an alert because the second device 190 is at the bow of the watercraft, because the user is not on or near the second device 190, and because the device within the chair being located at the bow of the watercraft is not within a radius of proximity of the helm. At operation 214, the second device 190 may decide not to make the alert.

At operation 254, the third device 192 may be configured to pick up the ping signal from the network 194 and receive the instructions. The third device 192 may then be configured to decide whether to perform the alert based on the instructions so as to notify a user of the occurrence of the one or more triggers. Further, the third device 192 may be configured to make the alert at a location and in a manner corresponding to the third device 192. In some embodiments, the third device 192 may, in some embodiments, determine a location of the third device 192 at operation 216. For example, the third device 192 may be a device within a chair, and the device within the chair may, at operation 216, determine the location of the chair, e.g., in relation to the watercraft and/or in relation to other devices on the watercraft to determine whether the device within the chair is within a desired area for the alert. As a further example, the chair may be located at a stern of the watercraft (e.g., the chair may be a fighting chair for fishing), and the device within the watercraft may be configured to determine that the chair (and the device therewithin) is located at the stern of the watercraft at operation 216. While the location of the third device 192 may not matter in some embodiments, in other embodiments, the location of the third device 192 may dictate whether the user who is purportedly near or on the third device 192 should be notified.

Similarly, the third device 192 may, at operation 218, attempt to determine the location of the user to, e.g., determine whether the user is near the third device 192 (e.g., determine whether the user is sitting in the chair). For example, the device within the chair may include a sensor configured to detect whether a weight of, e.g., greater than 90 pounds is disposed within the chair. Additionally or alternatively, the device within the chair may communicate with a smartwatch worn by a user to determine whether the device within the chair and the smartwatch are in a same location, indicating that the user is in fact sitting in or standing near the chair. The location of the user with respect to the third device 192 may dictate whether the user who is purportedly on or near the third device 192 should be notified. For example, if the user were determined to not be sitting in the chair and/or smartwatch data showed that the user was located elsewhere, it would not be useful for the device within the chair to make an alert. However, if the user were determined to be standing near the chair (perhaps with a leg and/or a knee of the user placed thereon), it may be useful for the device within the chair to make an alert even if the sensor is not detecting a weight of greater than 90 pounds being exerted on the chair.

Similarly, the third device 192 may, at operation 220, determine the location(s) of the one or more trigger(s), to determine if the third device 192 is one of the devices on the watercraft that is closest to the location(s) of the one or more trigger(s). For example, in the example in which the third device 192 is a device within a chair at the stern of the watercraft and there are three jet skis traveling toward the watercraft while a fish is biting on a fishing line of the watercraft, the locations of the triggers are at the helm (e.g., the navigation system, which is how the user can navigate around the three jet skis) and at the stern of the watercraft (e.g., the fish is biting on a line coming from the stern of the watercraft). While the location(s) of the one or more trigger(s) may not matter in some embodiments, in other embodiments, the location(s) of the one or more trigger(s) may dictate whether the user who is purportedly near or on the third device 192 should be notified.

The third device 192 may further be configured to, at operation 222, determine whether the location of the third device 192 matches the location(s) of the one or more trigger(s) and/or the location of the user, as determined at one or more of operation 216, operation 218, and/or operation 220. In the embodiment shown in FIG. 6, the third device 192 determines that the location of the third device 192 matches the location(s) of trigger(s) and/or the location of the user at operation 222. For example, in the example in which the third device 192 is a device within a chair at the stern of the watercraft and there are three jet skis traveling toward the watercraft while a fish is biting on a fishing line of the watercraft, the third device 192 being located at the stern may be located in a zone of the fish biting on the line and, in some embodiments, within a certain radius of the helm (depending on how large the radius is). In that example, the third device 192 would determine at operations 216, 218, and 220 that the third device 192 is at the stern of the boat, that the user is on or near the third device 192 because the user is located in the same location as the third device 192 (e.g., the user's smartwatch is in the same location as the third device 192) or because a weight of the user is detected on the chair, and that the locations of the triggers are at the helm (e.g., the navigation system, which is how the user can navigate around the three jet skis) and at the stern of the watercraft (e.g., the fish is biting on a line coming from the stern of the watercraft). The third device 192 may then determine at operation 222 that the third device 192 is in a position to make an alert because the third device 192 is at the stern of the boat, because the user is on or near the third device 192, and possibly also because the user being located at the stern of the boat is within a radius of proximity of the helm, which may be close enough to be notified of the three jet skis coming at the watercraft.

The third device 192 may then determine whether previous alerts have been made by the third device 192 at operation 224 and then determine a severity level of the alert circumstance at operation 225. For example, if the third device 192 determines that it has already made two previous alerts for the same reason (e.g., because of the three jet skis coming towards the watercraft and/or because of the fish biting on the line coming from the stern of the watercraft) at operation 224, the third device 192 may determine a higher severity level at operation 225. In the embodiment shown in FIG. 6, the third device 192 has not made any previous alerts, but other factors cause the third device 192 to determine a higher severity level at operation 225. For example, although the sole fact that a fish is biting on a line may dictate a low severity level, the fact that three jet skis are coming toward the watercraft at the same time as the fish biting on the line cause the third device 192 to determine a higher severity level at operation 225. In some embodiments, the third device 192 may also communicate with the network 194 or to obtain additional data from external locations and/or other devices to better determine whether previous alerts have been made (by the third device 192 or by any other device) at operation 224 and to then determine a severity level of the alert circumstance at operation 225.

At operation 226, the third device 192 may decide to make the alert, and then at operation 228, the third device 192 may decide how the trigger(s) should be reported. For example, in the example in which the third device 192 is a device within a chair located at the stern of the watercraft and there are three jet skis traveling toward the watercraft while a fish is biting on a fishing line of the watercraft, the third device 192 may determine based on the severity level and the location of the user and third device 192 that it should vibrate and/or shake. The vibration and/or shaking may communicate to the user, for example, that there is another problem on the watercraft other than the fact that a fish has bitten (e.g., assuming that the user who is sitting in or near the chair can see that a fish has bitten). This may be useful, for example, when the chair in which the third device 192 is disposed is a fighting chair that the user may be sitting in to fight and reel in the fish. Depending on the other users in the watercraft, the user may decide whether to abandon the fish and travel to the helm of the watercraft to fix the navigation problem. If the third device 192 detects that another user is closer to the helm than the user holding the third device 192, however, the first device may determine that the user needs to help with the reeling in of the fish and may determine the mode of the alert accordingly. For example, the third device 192 might decide not to make the alert at all at operation 226. Other methods of alerting the user with the third device 192 are contemplated.

The third device 192 may then cause the alert at operation 230 and then, in some embodiments, record the alert being made by the third device 192 at operation 232. Further, in some embodiments, the recordation of the alert by the third device 192 at operation 232 may be communicated back to the network 194 such that, e.g., severity levels can be more accurately determined by other devices.

A processor of the system 188 may also be configured to determine whether a desired one of a plurality of devices (e.g., first device 186, second device 190, and third device 192) performed an alert in response to a sent ping signal. The system 188 may then determine, in response to a determination that, e.g., second device 190, did not perform the alert, a second occurrence of one or more second triggers at operation 198. The system 188 may then generate second instructions for one or more of the plurality of devices to perform a second alert corresponding to the second occurrence of the one or more second triggers at operation 200 and send the second instructions as a second ping signal within the network 194 at operation 202. Each of the plurality of devices (e.g., first device 186, second device 190, and third device 192) would then receive the second ping signal via the network 194 and then be able to determine whether to perform the second alert based on the second instructions so as to notify the user of the second occurrence of the one or more second triggers.

It should be appreciated that the timeline 184 may include more or less devices than the first device 186, second device 190, and third device 192 shown in FIG. 6, and that the operations shown may be, in other embodiments, in any other order. Further, some operations may be omitted, and other operations may be added.

Example System Architecture

Figure 7:
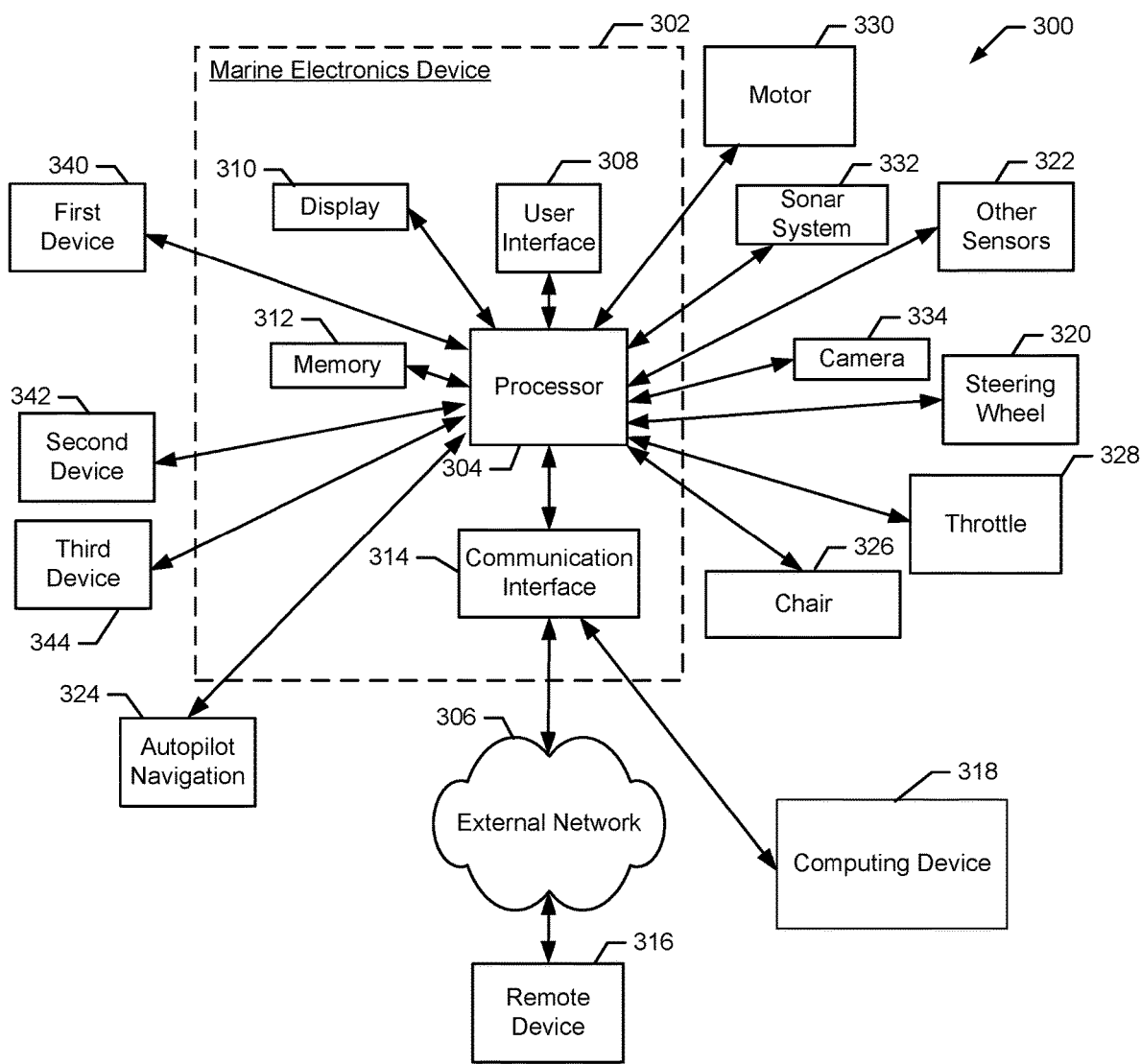
FIG. 7 is a block diagram of an example system capable of causing one or more devices to make an alert, in accordance with some embodiments described herein.

FIG. 7 shows a block diagram of an example system 300 capable for use with several embodiments of the present disclosure. As shown, the system 300 may include a number of different modules or components, each of which may comprise any device or means embodied in either hardware, software, or a combination of hardware and software configured to perform one or more corresponding functions. For example, the system 300 may include a marine electronics device 302 (e.g., controller) and various sensors/system.

The marine electronics device 302, controller, remote control, MFD, and/or user interface display may include a processor 304, a memory 312, a communication interface 314, a user interface 308, and a display 310. The processor 304 may be in communication with one or more devices such as motor 330, sonar system 332, camera 334, throttle 328, chair 326, steering wheel 320, first device 340, second device 342, third device 344, and/or other sensors 322 to determine whether one or more triggers have occurred and to subsequently determine and execute one or more alerts. For example, the sonar system 332 and/or the other sensors 322 may communicate to the processor that one or more triggers have occurred, such as an identification and/or a detection of an obstacle, and the processor may then send signals to the first device 340, the chair 326, and the throttle 328 to execute a certain alert that was pre-programmed by the user or that was automatically generated by the processor based on data received from sources such as the chair 326, the first device 340, the second device 342, the third device 344, and/or other sensors 322. For example, the chair 326 may indicate to the processor 304 that a weight greater than, e.g., 90 pounds is being exerted on a seat of the chair 326, indicating that a user is sitting in the chair 326. Other devices or sensors may communicate further information about a user and/or a scenario to the processor 304. The processor 304 may then determine where and how an alert should be made and then execute one or more alerts. For example, if the sonar system 332 indicates to the processor 304 that an obstacle is in the water and then the chair 326 indicates that a user is sitting in the chair 326, the processor 304 may determine that a user is sitting in the chair 326 and then cause an actuator within the chair 326 to vibrate or shake. Additionally or alternatively, the processor 304 may cause alerts through or with other devices such as by vibrating or shaking the throttle 328, the first device 340, the second device 342, the third device 344, and/or the steering wheel 320. Further, in some embodiments, the processor 304 may cause alerts with or through other systems such as using the camera 334 or the display 310. Other alert methods are also contemplated.

In some embodiments, the system 300 may be configured to receive, process, and display various types of marine data. In some embodiments, the system 300 may include one or more processors 304 and a memory 312. Additionally, the system 300 may include one or more components that are configured to gather marine data or perform marine features. In such a regard, the processor 304 may be configured to process the marine data and generate one or more images corresponding to the marine data for display on the screen that is integrated in the marine electronics device. Further, the system 300 may be configured to communicate with various internal or external components (e.g., through the communication interface 314), such as to provide instructions related to the marine data.

The processor 304 may be any means configured to execute various programmed operations or instructions stored in a memory, such as a device and/or circuitry operating in accordance with software or otherwise embodied in hardware or a combination thereof (e.g., a processor operating under software control, a processor embodied as an application specific integrated circuit (ASIC) or field programmable gate array (FPGA) specifically configured to perform the operations described herein, or a combination thereof) thereby configuring the device or circuitry to perform the corresponding functions of the processor 304 as described herein. In this regard, the processor 304 may be configured to analyze electrical signals communicated thereto to provide, e.g., display data to the display to indicate the direction of the sonar system 332 relative to the marine vessel or to indicate a status of a user detected by the chair 326.

In some example embodiments, the processor 304 may be configured to receive sonar data indicative of the size, location, shape, etc. of objects detected by the system 300. For example, the processor 304 may be configured to adjust a position of the sonar system 332, receive sonar return data, and process the sonar return data to generate sonar image data for display to a user (e.g., on display 310). In some embodiments, the processor 304 may be further configured to implement signal processing and/or enhancement features to improve the display characteristics, data, and/or images, to collect and/or process additional data (e.g., time, temperature, GPS information, waypoint designations), and/or to filter extraneous data to better analyze the collected data. In some embodiments, the processor 304 may further implement notices and/or alarms (e.g., alerts determined or adjusted by a user) to reflect depth measurements, the presence of fish, the proximity of other marine vessels, status or notifications for peripheral devices/systems, etc. The processor 304 and memory 312 may form processing circuitry.

The memory 312 may be configured to store instructions, computer program code, marine data (e.g., sonar data, chart data, location/position data), and/or other data associated with the system 300 in a non-transitory computer readable medium for use by the processor, for example.

The system 300 may also include one or more communications modules configured to communicate via any of many known manners, such as via a network, for example. The processing circuitry and communication interface 314 may form a processing circuitry/communication interface. The communication interface 314 may be configured to enable connections to external systems (e.g., an external network 306 or one or more remote controls, such as a handheld remote control, marine electronics device, foot pedal, or other remote computing device). In this regard, the communication interface (e.g., 314) may include one or more of a plurality of different communication backbones or frameworks, such as Ethernet, USB, CAN, NMEA 2000, GPS, Sonar, cellular, Wi-Fi, and/or other suitable networks, for example. In this manner, the processor 304 may retrieve stored data from a remote, external server via the external network 306 in addition to or as an alternative to the onboard memory 312. The network may also support other data sources, including GPS, autopilot, engine data, compass, radar, etc. Numerous other peripheral, remote devices such as one or more wired or wireless multi-function displays may be connected to the system 300.

It should be appreciated that devices and/or systems such as the first device 340, the second device 342, and the third device 344 may, in some other embodiments (such as the embodiment discussed herein with respect to FIG. 8), be in communication with a processor such as the processor 304 through a network such as the external network 306. That is, in some other embodiments, the first device 340, the second device 342, and the third device 344, and even devices such as the chair 326, may be in direct communication with a network that is connected to the processor 304 rather than being in direct communication with the processor 304 itself. In some other embodiments, the first device 340, the second device 342, and the third device 344, and even devices such as the chair 326, may be in direct communication with the processor 304 and may also be in direct communication with a network. Other configurations are also contemplated.

The processor 304 may configure the marine electronic device 302 and/or circuitry to perform the corresponding functions of the processor 304 as described herein. In this regard, the processor 304 may be configured to analyze electrical signals communicated thereto to provide, for example, various features/functions described herein.

In some embodiments, the system 300 may be configured to determine the location of the marine vessel, such as through a location sensor. The system 300 may comprise, or be associated with, a navigation system that includes the location sensor. For example, the location sensor may comprise a GPS, bottom contour, inertial navigation system, such as a micro-electro-mechanical system (MEMS) sensor, a ring laser gyroscope, or the like, or other location detection system. In such a regard, the processor 304 may be configured to act as a navigation system. For example, the processor 304 may generate at least one waypoint and, in some cases, generate an image of a chart along with the waypoint for display by the screen. Additionally or alternatively, the processor may generate one or more routes associated with the watercraft. The location of the vessel, waypoints, and/or routes may be displayed on a navigation chart on a display remote from the system 300. Further, additional navigation features (e.g., providing directions, weather information, etc.) are also contemplated.

In addition to position, navigation, and sonar data, example embodiments of the present disclosure contemplate receipt, processing, and generation of images that include other marine data. For example, the display 310 and/or user interface 308 may be configured to display images associated with vessel or motor status (e.g., gauges) or other marine data.

In any of the embodiments, the display 310 may be configured to display an indication of the current direction of the marine vessel.

The display 310 may be configured to display images and may include or otherwise be in communication with a user interface 308 configured to receive input from a user. The display 310 may be, for example, a conventional liquid crystal display (LCD), LED/OLED display, touchscreen display, mobile media device, and/or any other suitable display known in the art, upon which images may be displayed. In some embodiments, the display 310 may be the MFD and/or the user's mobile media device. The display may be integrated into the marine electronic device 302. In some example embodiments, additional displays may also be included, such as a touch screen display, mobile media device, or any other suitable display known in the art upon which images may be displayed.

In some embodiments, the display 310 may present one or more sets of marine data and/or images generated therefrom. Such marine data may include chart data, radar data, weather data, location data, position data, orientation data, sonar data, and/or any other type of information relevant to the marine vessel. In some embodiments, the display 310 may be configured to present marine data simultaneously as one or more layers and/or in split-screen mode. In some embodiments, the user may select various combinations of the marine data for display. In other embodiments, various sets of marine data may be superimposed or overlaid onto one another. For example, a route may be applied to (or overlaid onto) a chart (e.g., a map or navigation chart). Additionally, or alternatively, depth information, weather information, radar information, sonar information, and/or any other display inputs may be applied to and/or overlaid onto one another.

In some embodiments, the display 310 and/or user interface may be a screen that is configured to merely present images and not receive user input. In other embodiments, the display and/or user interface may be a user interface such that it is configured to receive user input in some form. For example, the screen may be a touchscreen that enables touch input from a user. Additionally, or alternatively, the user interface may include one or more buttons (not shown) that enable user input.

The user interface 308 may include, for example, a keyboard, keypad, function keys, mouse, scrolling device, input/output ports, touch screen, or any other mechanism by which a user may interface with the system.

In some embodiments, the system 300 may comprise an autopilot navigation 324 that is configured to operate the motor 330 to propel the marine vessel in a direction and at a speed. In some embodiments, the autopilot navigation 324 may direct the marine vessel to a waypoint (e.g., a latitude and longitude coordinate). Additionally, or alternatively, the autopilot may be configured to direct the marine vessel along a route, such as in conjunction with the navigation system. The processor 304 may generate display data based on the autopilot operating mode and cause an indication of the autopilot operating mode to be displayed on the digital display in the first portion, such as an autopilot icon.

In some embodiments, the system 300 may comprise a sonar system 332 including a sonar transducer assembly, which may be any type of sonar transducer (e.g., a downscan transducer, a sidescan transducer, a transducer array (e.g., for forming live sonar), among many others known to one of ordinary skill in the art). The sonar transducer assembly may be housed in the sonar system 332 and configured to gather sonar data from the underwater environment relative to the marine vessel. Accordingly, the processor 304 (such as through execution of computer program code) may be configured to adjust an orientation of the sonar transducer assembly within the sonar system 332 and receive an indication of operation of the sonar transducer assembly. The processor 304 may generate additional display data indicative of the operation of the sonar transducer and cause the display data to be displayed on the digital display. For example, a sonar icon (not shown) may be energized to indicate that the sonar transducer is operating.

In some embodiments, the sonar system 332 may be used to determine depth and bottom topography, detect fish, locate wreckage, etc. Sonar beams, from a sonar transducer assembly, can be transmitted into the underwater environment. The sonar signals reflect off objects in the underwater environment (e.g., fish, structure, sea floor bottom, etc.) and return to the sonar transducer assembly, which converts the sonar returns into sonar data that can be used to produce an image of the underwater environment.

In an example embodiment, the system 300 may include a speed sensor, such as an electromagnetic speed sensor, paddle wheel speed sensor, or the like. The speed sensor may be configured to measure the speed of the marine vessel through the water. The processor 304 may receive speed data from the speed sensor and generate additional display data indicative of the speed of the marine vessel through the water. The speed data may be displayed, such as in text format on the first portion of the digital display. The speed data may be displayed in any relevant unit, such as miles per hour, kilometers per hour, feet per minute, or the like. In some instances, a unit identifier, such as a plurality of LEDs, may be provided in association with the display (may be shown in normal text or with a seven-digit display). The processor 304 may cause an LED associated with the appropriate unit for the speed data to be illuminated.

In some embodiments, the system 300 further includes a power source (e.g., battery) that is configured to provide power to the various components. In some embodiments, the power source is rechargeable. In some example embodiments, the system 300 includes a battery sensor. The battery sensor may include a current sensor or voltage sensor configured to measure the current charge of a battery power supply of the system 300 (e.g., the power source). The battery sensor may be configured to measure individual battery cells or measure a battery bank. The processor 304 may receive battery data from the battery sensor and determine the remaining charge on the battery. In an example embodiment, the voltage or current measured by the battery sensor may be compared to a reference value or data table, stored in memory 312, to determine the remaining charge on the battery.

In some embodiments, the system 300 may include other sensors such as other sensors 322. For example, in some embodiments, the system 300 may include an accelerometer for measuring acceleration data, which may be logged by the processor. The acceleration data may be utilized, e.g., for detecting sudden unwanted movements of the watercraft (e.g., from hitting an obstacle), which could qualify, in some embodiments, as being an occurrence of one or more triggers.

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCS, minicomputers, mainframe computers, smart phones, tablets, wearable computers, cloud computing systems, virtual computers, marine electronics devices, and the like.

The various technologies described herein may be implemented in general context of computer-executable instructions, such as program modules, being executed by a computer. Generally, program modules may include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some instances, program modules may be implemented on separate computing systems and/or devices adapted to communicate with one another. Further, a program module may be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. As such, the computing systems may be configured to operate using sonar, radar, GPS and like technologies.

The various technologies described herein may also be implemented in distributed computing environments where tasks are performed by remote processing devices that are linked through a communications network (e.g., by hardwired links, wireless links, or combinations thereof). In a distributed computing environment, program modules may be located in both local and remote computer storage media including memory storage devices.

The system 300 may include a computing device or system 318 (e.g., mobile media device) into which implementations of various technologies and techniques described herein may be implemented. Computing device 318 may be a conventional desktop, a handheld device, a wearable device, a controller, a personal digital assistant, a server computer, an electronic device/instrument, a laptop, a tablet, or part of a navigation system, marine electronics, or sonar system. It should be noted, however, that other computer system configurations may be used.

In various implementations, each marine electronic device 302 described herein may be referred to as a marine device or as an MFD. The marine electronic device 302 may include one or more components disposed at various locations on a marine vessel. Such components may include one or more data modules, sensors, instrumentation, and/or any other devices known to those skilled in the art that may transmit various types of data to the marine electronic device 302 for processing and/or display. The various types of data transmitted to the marine electronic device 302 may include marine electronics data and/or other data types known to those skilled in the art. The marine data received from the marine electronic device 302 or system 300 may include chart data, sonar data, structure data, radar data, navigation data, position data, heading data, automatic identification system (AIS) data, Doppler data, speed data, course data, or any other type known to those skilled in the art.

In one implementation, the marine electronic device 302 may include a radar sensor for recording the radar data and/or the Doppler data, a compass heading sensor for recording the heading data, and a position sensor for recording the position data. In another implementation, the marine electronic device 302 may include a sonar transducer for recording the sonar data, an AIS transponder for recording the AIS data, a paddlewheel sensor for recording the speed data, and/or the like.

The marine electronic device 302 may receive external data via a LAN or a WAN. In some implementations, external data may relate to information not available from various marine electronics systems. The external data may be retrieved from various sources, such as, e.g., the Internet or any other source. The external data may include atmospheric temperature, atmospheric pressure, tidal data, weather, temperature, moon phase, sunrise, sunset, water levels, historic fishing data, and/or various other fishing and/or trolling related data and information.

The marine electronic device 302 may be attached to various buses and/or networks, such as a National Marine Electronics Association (NMEA) bus or network, for example. The marine electronic device 302 may send or receive data to or from another device attached to the NMEA 2000 bus. For instance, the marine electronic device 302 may transmit commands and receive data from a motor or a sensor using an NMEA 2000 bus. In some implementations, the marine electronic device 302 may be capable of steering a marine vessel and controlling the speed of the marine vessel (e.g., autopilot). For instance, one or more waypoints may be input to the marine electronic device 302, and the marine electronic device 302 may be configured to steer the marine vessel to the one or more waypoints. Further, the marine electronic device 302 may be configured to transmit and/or receive NMEA 2000 compliant messages, messages in a proprietary format that do not interfere with NMEA 2000 compliant messages or devices, and/or messages in any other format. In various other implementations, the marine electronic device 302 may be attached to various other communication buses and/or networks configured to use various other types of protocols that may be accessed via, e.g., NMEA 2000, NMEA 0183, Ethernet, Proprietary wired protocol, etc. In some implementations, the marine electronic device 302 may communicate with various other devices on the marine vessel via wireless communication channels and/or protocols.

In some implementations, the marine electronic device 302 may be connected to a global positioning system (GPS) receiver. The marine electronic device 302 and/or the GPS receiver may be connected via a network interface. In this instance, the GPS receiver may be used to determine position and coordinate data for a marine vessel on which the marine electronic device 302 is disposed. In some instances, the GPS receiver may transmit position coordinate data to the marine electronic device 302. In various other instances, any type of known positioning system may be used to determine and/or provide position coordinate data to/for the marine electronic device 302.

The marine electronic device 302 may be configured as a computing system similar to computing device 318.

Figure 8:
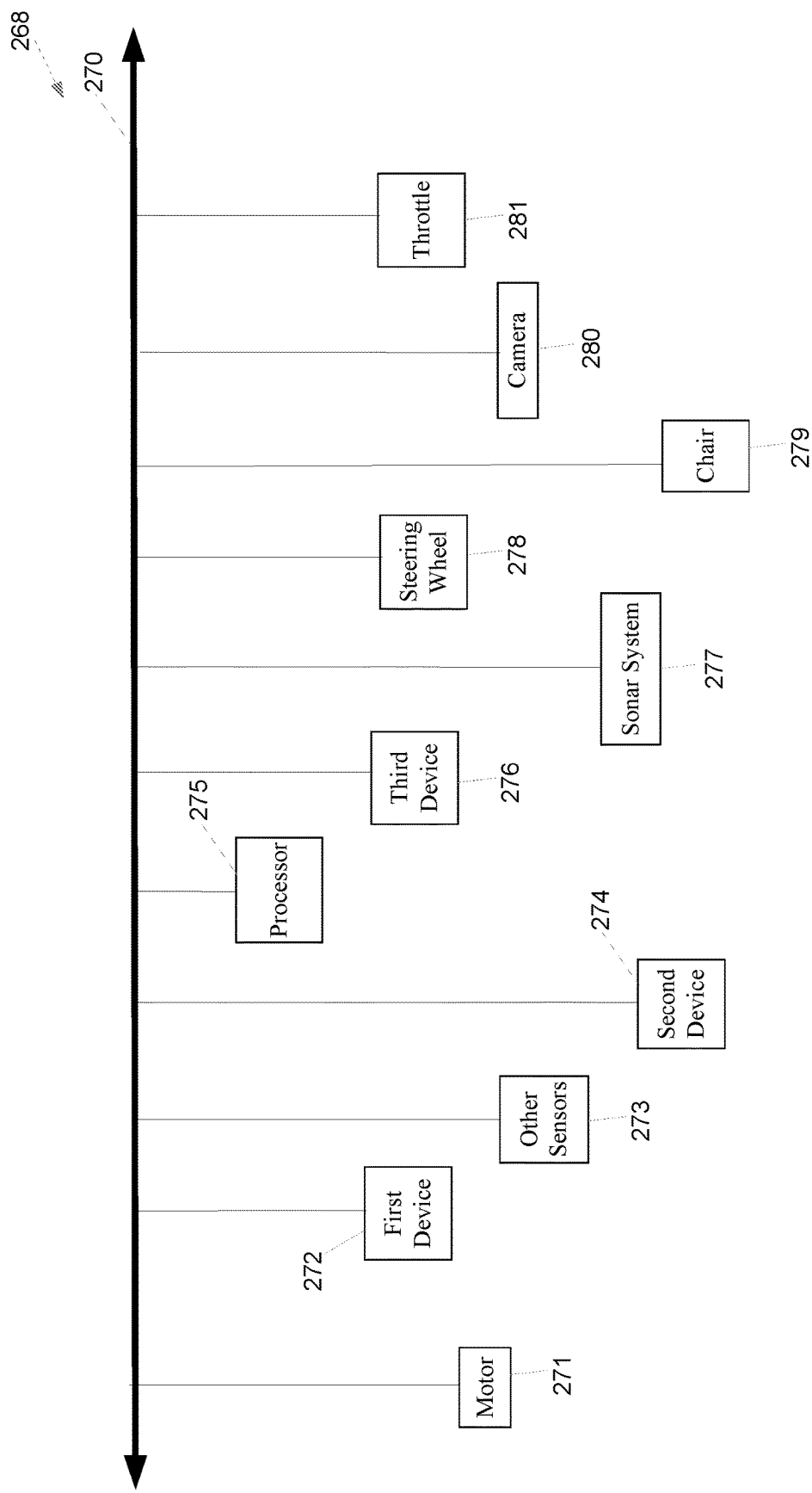
FIG. 8 is a network diagram of an example system capable of allowing one or more devices to receive a ping signal from a network, in accordance with some embodiments described herein.

FIG. 8 demonstrates a system 268 with another configuration. In the embodiment shown in FIG. 8, multiple devices and systems are connected and/or are in communication with a network BUS 270. The system 268 may be similar to the system 300 discussed herein with respect to FIG. 7, however, in embodiments such as the embodiment shown in FIG. 8, the one or more devices are in communication with the network BUS 270 rather than being in direct communication with a processor of a marine electronic device. As shown, the network BUS 270 may be in communication with not only a processor 275, but also with a first device 272, a second device 274, a third device 276, a motor 271, a sonar system 277, a steering wheel 278, a chair 279, a camera 280, a throttle 281, and/or other sensors 273. The processor 275 may therefore be configured to generate and send a ping signal to the network BUS 270 such that one or more of the first device 272, second device 274, third device 276, motor 271, sonar system 277, steering wheel 278, chair 279, camera 280, throttle 281, and/or other sensors 273 can pick up the ping signal. In some embodiments, the ping signal may be configured such that the one or more devices can decide itself whether to make an alert based on one or more sources of information, but in some other embodiments, the ping signal may be configured such that the ping signal itself tells each of the one or more devices that pick up the ping signal whether to and how to make an alert.

Example Flowchart

Embodiments of the present disclosure provide methods for alerting a user on a watercraft. Various examples of the operations performed in accordance with embodiments of the present disclosure will now be provided with reference to FIG. 9-10.

Figure 9:
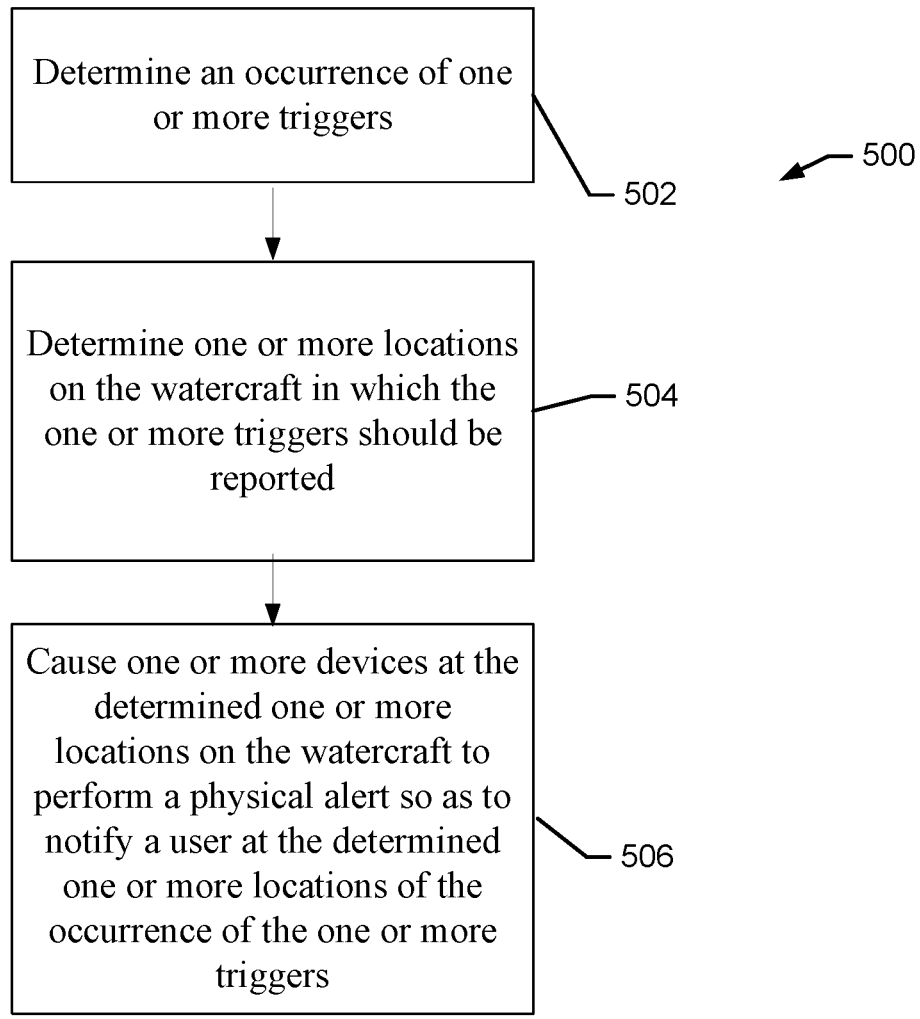
FIG. 9 shows a flowchart illustrating an example method for alerting a user on a watercraft, in accordance with some embodiments described herein.

FIG. 9 illustrates a flowchart according to an example method for alerting a user on a watercraft according to an example embodiment 500. The operations illustrated in and described with respect to FIG. 9 may, for example, be performed by, with the assistance of, and/or under the control of one or more of the processor 304, the processor 275, and/or other components described herein.

Operation 502 may comprise determining an occurrence of one or more triggers (e.g., by identifying an object within an image, recognizing a system fault, detecting a triggering event, detecting an object in a body of water, etc.). In some embodiments, determining the occurrence of the one or more triggers at operation 502 may include at least one of gathering marine data based on a marine environment, retrieving data from an external network, analyzing vessel data, determining a location of the user, retrieving previous events from the memory and determining whether the one or more triggers have occurred in a recent past, determining a status of a sensor and/or retrieving a status from a marine electronic device. The processor 304, marine electronic device 302, display 310, and/or computing device 318 may, for example, provide means for performing operation 502. Operation 502 may be optional.

Operation 504 may comprise determining one or more locations on the watercraft in which the one or more triggers should be reported. In some embodiments, operation 504 may comprise at least one of communicating with at least one of a location sensor, a position sensor, or a GPS device within a mobile device to determine a location of the mobile device, determining a likely location of the user based on detected weight shifts of the watercraft, determining a weight of an object being held by a chair using a weight sensor in the chair, sending alerts to various devices positioned at different locations on the watercraft and determining which of the alerts are received, and/or or determining that a location of the user is undetectable and determining that alerts should be sent to multiple locations on the watercraft. In other embodiments, operation 504 may comprise determining one or more locations on the watercraft in which the one or more triggers should be reported in any other manner. The processor 304, marine electronic device 302, display 310, and/or computing device 318 may, for example, provide means for performing operation 504. Operation 504 may be optional.

Operation 506 may comprise causing one or more devices at the determined one or more locations on the watercraft to perform a physical alert so as to notify a user at the determined one or more locations of the occurrence of the one or more triggers. For example, causing the physical alert at operation 506 may include sending a signal to a network with specific instructions, and the specific instructions may correspond to at least one of the occurrence of the one or more triggers, the one or more locations of the one or more triggers, or the physical alert. The processor 304, marine electronic device 302, display 310, and/or computing device 318 may, for example, provide means for performing operation 506. Operation 506 may be optional.

Figure 10:
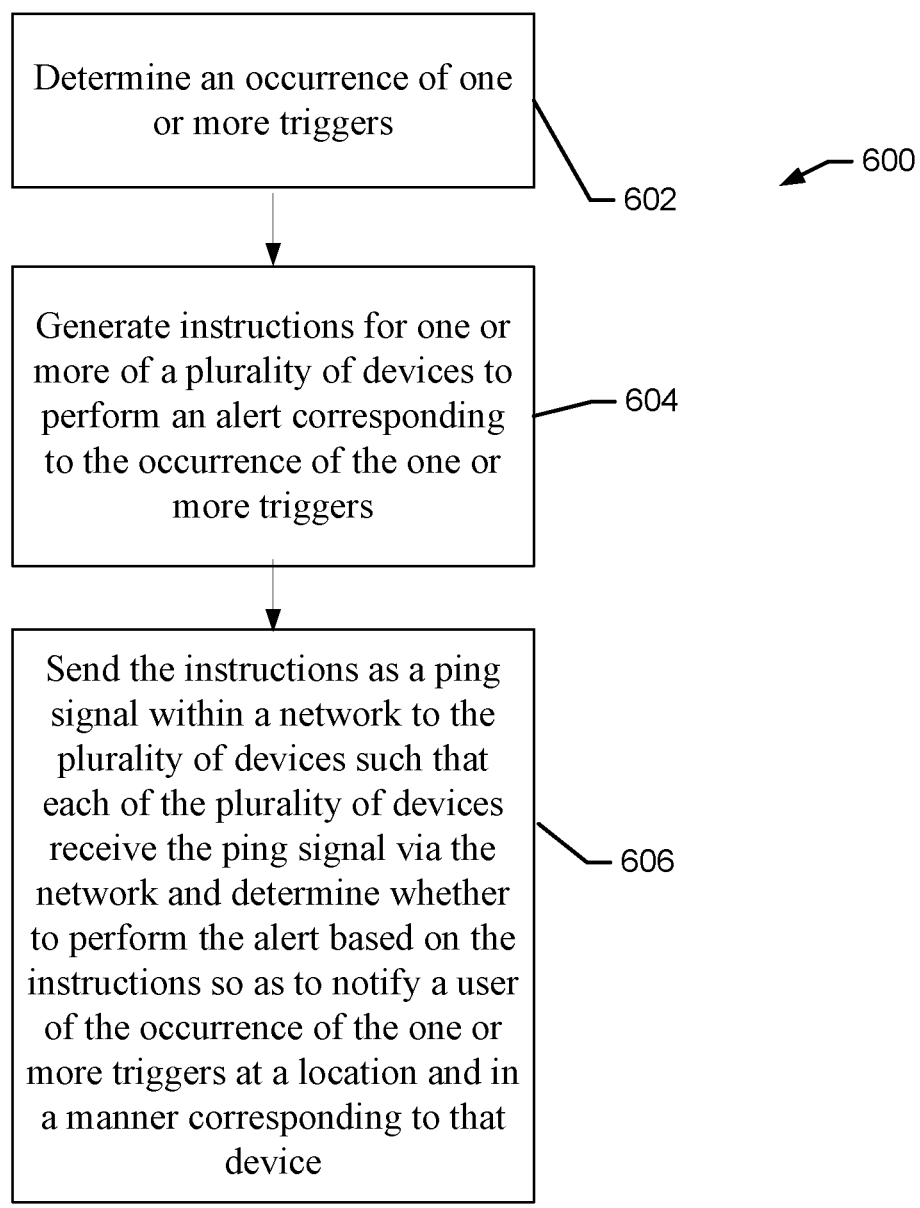
FIG. 10 shows a flowchart illustrating another example method for alerting a user on a watercraft, in accordance with some embodiments described herein.

FIG. 10 illustrates a flowchart according to an example method for alerting a user on a watercraft according to an example embodiment 600. The operations illustrated in and described with respect to FIG. 10 may, for example, be performed by, with the assistance of, and/or under the control of one or more of the processor 304, the processor 275, and/or other components described herein.

Operation 602 may include determining an occurrence of one or more triggers (e.g., by identifying an object within an image, recognizing a system fault, detecting a triggering event, detecting an object in a body of water, etc.). In some embodiments, determining the occurrence of the one or more triggers at operation 602 may include at least one of gathering marine data based on a marine environment, retrieving data from an external network, analyzing vessel data, determining a location of the user, retrieving previous events from the memory and determining whether the one or more triggers have occurred in a recent past, determining a status of a sensor and/or retrieving a status from a marine electronic device. The processor 275 may, for example, provide means for performing operation 602. Operation 602 may be optional.

Operation 604 may include generating instructions for one or more of a plurality of devices to perform an alert corresponding to the occurrences of the one or more triggers. In some embodiments, operation 604 may involve generating instructions configured to allow the one or more of the plurality of devices to decide whether to use the instructions to perform the alert by, e.g., determining locations of the device, the trigger(s), and/or a user, comparing the locations, determining whether previous alerts have been made, and/or determining a severity level of the alert. In other embodiments, operation 604 may comprise generating instructions in any other manner. The processor 275 may, for example, provide means for performing operation 604. Operation 604 may be optional.

Operation 606 may include sending the instructions as a ping signal within a network to the plurality of devices such that each of the plurality of devices receive the ping signal via the network and determine whether to perform the alert based on the instructions so as to notify a user of the occurrence of the one or more triggers at a location and in a manner corresponding to that device. For example, an actuator device within a chair on the watercraft may pick up the ping signal and then decide not to perform the alert after determining that a user is not sitting in the chair (e.g., because no weight is detected in a sitting area of the chair). The processor 275 may, for example, provide means for performing operation 606. Operation 606 may be optional.

In some embodiments, the methods for alerting a user on a watercraft may include additional, optional operations, and/or the operations described above may be modified or augmented.

CONCLUSION

Many modifications and other embodiments of the inventions set forth herein may come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A system for alerting a user on a watercraft, the system comprising:
   a processor; and
   a memory including computer executable instructions, the computer executable instructions configured to, when executed by the processor, cause the processor to:
      determine an occurrence of one or more triggers, wherein each of the one or more triggers corresponds to at least one of:
         identifying an object within an image,
         recognizing a system fault,
         detecting a triggering event, or
         detecting an object in a body of water;
      determine, in response to the determination of the occurrence of the one or more triggers, one or more locations on the watercraft in which to report the one or more triggers;
      cause at least one signal to be sent through a network of the watercraft to one or more devices positioned at the determined one or more locations, wherein the network is configured to provide communication between multiple devices on the watercraft; and
      cause, based on the at least one signal, the one or more devices at the determined one or more locations on the watercraft to perform a physical alert so as to notify a user at the determined one or more locations of the occurrence of the one or more triggers.

2. The system of claim 1, wherein determining the occurrence of the one or more triggers includes at least one of:
   gathering marine data based on a marine environment;
   retrieving data from an external network;
   analyzing vessel data;
   determining a location of the user;
   retrieving previous events from the memory and determining whether the one or more triggers have occurred in a recent past;
   determining a status of a sensor; or
   retrieving a status from a marine electronic device.

3. The system of claim 1, wherein determining the one or more locations in which to report the one or more triggers includes at least one of:
   communicating with at least one of a location sensor, a position sensor, or a GPS device within a mobile device to determine a location of the mobile device;
   determining a likely location of the user based on detected weight shifts of the watercraft;
   determining a weight of an object being held by a chair using a weight sensor in the chair;
   sending alerts to various devices positioned at different locations on the watercraft and determining which of the alerts are received; or
   determining that a location of the user is undetectable and determining that alerts should be sent to multiple locations on the watercraft.

4. The system of claim 1, wherein the physical alert is a plurality of physical alerts that are configured to escalate based on a number of previous occurrences of the one or more triggers, and wherein the plurality of physical alerts is configured to escalate by the processor assigning severity levels to each occurrence and causing different alerts for each of the severity levels.

5. The system of claim 4, wherein the severity levels increase based on a period of elapsed time without a detected response.

6. The system of claim 1, wherein the physical alert includes at least one of:
   alteration of one or more trim tabs;
   vibration of one or more of a seat, a steering wheel, or a throttle;
   adjustment of a seat;
   alteration of a rudder; or
   modification of a power state of a pump.

7. The system of claim 1, wherein the physical alert includes at least one of:
   flashing of one or more lights;
   vibration of one or more of a wristband, a belt, a mobile device, or a throttle;
   a visual alert on a heads up display;
   a visual alert on a marine electronic device; or
   alteration of an engine speed.

8. The system of claim 1, wherein the at least one signal includes specific instructions, and wherein the specific instructions correspond to at least one of the occurrence of the one or more triggers, the one or more locations of the one or more triggers, or the physical alert.

9. The system of claim 8, wherein the network is a wired network.

10. The system of claim 8, wherein the network is a wireless network.

11. The system of claim 1, wherein the processor is integrated within a marine electronic device on the watercraft.

12. The system of claim 1, wherein the processor is in communication with a mobile device such that the processor can cause the mobile device to vibrate or display visual alerts.

13. The system of claim 1, wherein detecting the triggering event includes detecting movement of an anchor.

14. The system of claim 1, wherein identifying the object within the image includes at least one of:
   identifying an obstacle within the image,
   identifying a person within the image, or
   identifying an animal within the image.

15. The system of claim 1, wherein recognizing the system fault includes recognizing that a command from an autopilot system was not properly executed.

16. The system of claim 1, wherein the system fault includes recognizing that a pre-determined amount of time without user interaction has occurred after a prompt was initiated.

17. A device for alerting a user on a watercraft, the device comprising:
   a processor; and
   a memory including computer executable instructions, the computer executable instructions configured to, when executed by the processor, cause the processor to:
      determine an occurrence of one or more triggers, wherein each of the one or more triggers corresponds to at least one of:
         identifying an object within an image,
         recognizing a system fault,
         detecting a triggering event, or
         detecting an object in a body of water;

determine, in response to the determination of the occurrence of the one or more triggers, one or more locations on the watercraft in which to report the one or more triggers;

cause at least one signal to be sent through a network of the watercraft to one or more devices positioned at the determined one or more locations, wherein the network is configured to provide communication between multiple devices on the watercraft; and cause, based on the at least one signal, the one or more devices at the determined one or more locations on the watercraft to perform a physical alert so as to notify a user at the determined one or more locations of the occurrence of the one or more triggers.

18. The device of claim 17, wherein determining the occurrence of the one or more triggers includes at least one of:

gathering marine data based on a marine environment;
retrieving data from an external network;
analyzing vessel data;
determining a location of the user;
retrieving previous events from the memory and determining whether the one or more triggers have occurred in a recent past;
determining a status of a sensor; or
retrieving a status from a marine electronic device.

19. The device of claim 17, wherein determining the one or more locations in which to report the one or more triggers includes at least one of:

communicating with at least one of a location sensor, a position sensor, or a GPS device within a mobile device to determine a location of the mobile device;
determining a likely location of the user based on detected weight shifts of the watercraft;
determining a weight of an object being held by a chair using a weight sensor in the chair;
sending alerts to various devices positioned at different locations on the watercraft and determining which of the alerts are received; or
determining that a location of the user is undetectable and determining that alerts should be sent to multiple locations on the watercraft.

20. A method of alerting a user on a watercraft, the method comprising:

determining an occurrence of one or more triggers, wherein each of the one or more triggers corresponds to at least one of:

identifying an object within an image,
recognizing a system fault,
detecting a triggering event, or
detecting an object in a body of water;

determining, in response to the determination of the occurrence of the one or more triggers, one or more locations on the watercraft in which to report the one or more triggers;

cause at least one signal to be sent through a network of the watercraft to one or more devices positioned at the determined one or more locations, wherein the network is configured to provide communication between multiple devices on the watercraft; and causing, based on the at least one signal, the one or more devices at the determined one or more locations on the watercraft to perform a physical alert so as to notify a user at the determined one or more locations of the occurrence of the one or more triggers.

* * * * *